(12) United States Patent
Szelest et al.

(10) Patent No.: US 12,246,723 B2
(45) Date of Patent: Mar. 11, 2025

(54) DATA RECORDING FOR ADVANCED DRIVING ASSISTANCE SYSTEM TESTING AND VALIDATION

(71) Applicant: Aptiv Technologies AG, Schaffhausen (CH)

(72) Inventors: Marcin Szelest, Cracow (PL); Mateusz Komorkiewicz, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 292 days.

(21) Appl. No.: 17/647,336

(22) Filed: Jan. 6, 2022

(65) Prior Publication Data

US 2022/0234588 A1   Jul. 28, 2022

(30) Foreign Application Priority Data

Jan. 22, 2021   (EP) .................................... 21152932

(51) Int. Cl.
*B60W 40/02* (2006.01)
*B60W 50/02* (2012.01)
(Continued)

(52) U.S. Cl.
CPC ........ *B60W 40/02* (2013.01); *B60W 50/0205* (2013.01); *B60W 50/14* (2013.01);
(Continued)

(58) Field of Classification Search
CPC .. B60W 40/02; B60W 50/0205; B60W 50/14; B60W 2554/00; B60W 2555/20;
(Continued)

(56) References Cited

U.S. PATENT DOCUMENTS 10,427,655 B2 * 10/2019 Nix ..................... G06F 11/3072
10,579,907 B1    3/2020 Kim et al.
(Continued)

FOREIGN PATENT DOCUMENTS

EP       2169635 A1 * 3/2010 ............ B60W 50/04
EP       2169635 B1 * 3/2010 ............ B60W 50/04
(Continued)

OTHER PUBLICATIONS

"Extended European Search Report", EP Application No. 20202071. 5, Apr. 9, 2021, 8 pages.
(Continued)

*Primary Examiner* — Yazan A Soofi
*Assistant Examiner* — Ahmed Alkirsh
(74) *Attorney, Agent, or Firm* — Harness, Dickey & Pierce, P.L.C.

(57) ABSTRACT

A system for assessing progress of a data recording campaign performed to collect sensor data recorded by a sensor data recorder mounted on a vehicle, the system including a metadata generating apparatus arranged to process data acquired by a sensor module to generate metadata for the sensor data, the metadata comprising classifications of an attribute of a driving environment the vehicle was in during the acquisition of the sensor data into respective classes of a predefined set of classes of the attribute, and transmit the metadata to a remote metadata processing apparatus, which is arranged to determine whether the metadata comprises at least a predetermined number of classifications in a predefined class of the set of predefined classes and, based on the determination, generate an indicator for use in the data recording campaign.

19 Claims, 7 Drawing Sheets

(51) Int. Cl.
*B60W 50/14* (2020.01)
*G01S 13/931* (2020.01)
*G06F 18/2431* (2023.01)
*G06F 18/25* (2023.01)
*G06V 20/58* (2022.01)
*G01S 13/86* (2006.01)

(52) U.S. Cl.
CPC ........ *G06F 18/2431* (2023.01); *G06F 18/251* (2023.01); *G06V 20/58* (2022.01); *B60W 2050/146* (2013.01); *B60W 2420/403* (2013.01); *B60W 2420/408* (2024.01); *B60W 2520/14* (2013.01); *B60W 2554/00* (2020.02); *B60W 2555/20* (2020.02); *G01S 13/865* (2013.01); *G01S 13/867* (2013.01); *G01S 13/931* (2013.01)

(58) Field of Classification Search
CPC ..... B60W 2420/408; B60W 2050/146; B60W 2420/403; B60W 2520/14; G06V 20/58; G06F 18/2431; G06F 18/251; G01S 13/865; G01S 13/867; G01S 13/931
USPC ......................................................... 701/117
See application file for complete search history.

(56) References Cited

U.S. PATENT DOCUMENTS

| | | | |
|---|---|---|---|
| 11,580,604 B1* | 2/2023 | Konrardy | B60W 10/20 |
| 2014/0148972 A1 | 5/2014 | Basir et al. | |
| 2017/0330397 A1 | 11/2017 | Palmer et al. | |
| 2019/0163178 A1* | 5/2019 | Sidle | G01S 15/931 |
| 2019/0318267 A1 | 10/2019 | Zhang | |
| 2020/0117950 A1 | 4/2020 | Thompson et al. | |
| 2020/0269864 A1* | 8/2020 | Zhang | G08G 1/165 |
| 2020/0324786 A1* | 10/2020 | Gray | B60W 60/0059 |
| 2021/0107530 A1* | 4/2021 | Buerkle | G08G 1/04 |
| 2021/0201056 A1* | 7/2021 | Potnis | G06V 10/774 |
| 2021/0387584 A1* | 12/2021 | Daniels | G06V 20/58 |
| 2022/0032932 A1* | 2/2022 | Kale | G06N 3/045 |
| 2022/0080977 A1* | 3/2022 | Ucar | B60W 40/09 |
| 2022/0205807 A1* | 6/2022 | Raut | B60W 60/005 |
| 2022/0343762 A1* | 10/2022 | Alvarez | B60W 50/14 |
| 2023/0049567 A1* | 2/2023 | Popov | G06N 7/01 |

FOREIGN PATENT DOCUMENTS

| | | |
|---|---|---|
| EP | 3159853 | 4/2017 |
| WO | 2018226492 | 12/2018 |
| WO | 2020079698 | 4/2020 |

OTHER PUBLICATIONS

"Extended European Search Report", EP Application No. 21152932.6, Jul. 5, 2021, 8 pages.

"Simplex algorithm—Wikipedia", Retrieved at: https://en.wikipedia.org/wiki/Simplex_algorithm—on Dec. 22, 2021, 15 pages.

Bell, et al., "Learning visual similarity for product design with convolutional neural networks", Jul. 2015, 10 pages.

Boureau, et al., "Learning Mid-Level Features for Recognition", Jun. 2010, 8 pages.

First Office Action regarding Chinese Patent Application No. 2022010070531.2, dated Dec. 19, 2024. Translation provided.

* cited by examiner

DATA RECORDING FOR ADVANCED DRIVING ASSISTANCE SYSTEM TESTING AND VALIDATION

CROSS-REFERENCE TO RELATED APPLICATION

This application claims priority to European Patent Application Number 21152932.6, filed Jan. 22, 2021, the disclosure of which is hereby incorporated by reference in its entirety herein.

BACKGROUND

The testing and validation of ADAS performance is complicated due to the diverse road conditions and traffic situations under which the ADAS of a host vehicle will be required to operate reliably. The performance of the ADAS may vary depending on features of the vehicle's environment, such as the number of vehicles in the vicinity of the host vehicle, weather and lighting conditions, the type of background environment (such as urban or rural environments) and sign variations in different countries, for example. In addition, a huge amount of real-world sensor data is required to train the artificial intelligence (AI) algorithms used by the ADAS electronic control unit (ECU). Usually, to create such large dataset, data recording campaigns called mother of all road trips (MOARTs) are performed with more than one recording vehicle. To account for different road situations, such data collections normally follow strictly defined requirements that specify the number of kilometers that should be recorded in specific road conditions.

An alternative approach to data collection for ADAS validation is to perform event-based data recording where, instead of continuously recording data, only situations of interest are recorded, such as for example, when the ADAS makes a mistake and driver needs to take over.

The recorded data (which is usually video footage but may additionally or alternatively include another type of data, such as Radar data, LIDAR data, ultrasound data, data from various vehicle sensors, time data and/or GPS data) is typically stored in data logs that are usually split into smaller pieces (e.g., 1 to 2 GB in size). At the end of the recording campaign, data from all vehicles is copied to temporary data storage, which are then shipped to data storage centers. Due to size of recorded data, it is not normally possible to stream the data via an Internet connection or the like.

A number of drawbacks exist with current methods of collecting data for validating and testing an ADAS ECU under development.

First of all, meeting the predefined strict requirements of different real-world road scenarios usually requires hundreds of thousands of kilometers of driving to be recorded. Furthermore, the recorded data cannot be verified online in real-time but needs to be stored in on-vehicle storage devices and only transferred to the data center later for processing. The period of time from when the data is recorded to when the data is available for analysis is typically measured in weeks.

Secondly, the recording campaign can require a lot of storage space. However, only a fraction of the recorded data is actually used for testing and validation of the ADAS. In particular, a lot of redundant video data might be recorded (for example, when the host vehicle is being driven at night on a motorway or in a traffic jam, where there is little or no overtaking and other vehicles in the vicinity of the host vehicle maintain their relative position).

Thirdly, route planning for the fleet of cars used for the recording campaign is usually prepared in advance. This means that missing and redundant data are only discovered when the recording campaign is over, and the recorded data is being analyzed at the data center.

Fourthly, event-based recording of the type described above requires the ADAS ECU to be in a mature state so that it is able to judge which situations are worth recording, and this is often not the case for early-stage ADAS projects where the ECU is in development.

Furthermore, mistakes in set-up of data-logging equipment (e.g., mixed signals, missing signals, corrupted sensor, miscalibration, etc.) may be detected only when recorded data is analyzed at the data center (usually following a delay of a few weeks).

Finally, only a small subset of the recorded data is selected as ground truth data for training an artificial intelligence algorithm (e.g., neural networks) of the ADAS. Labelling of ground truth data is an extremely time-consuming activity. For this reason, the optimal selection of data for forming the ground truth dataset involves selecting a minimal but sufficient amount of data.

SUMMARY

Example aspects described herein generally relate to the field of advanced driving assistance system (ADAS) testing and evaluation and, more particularly, to a system for assessing the progress of a data recording campaign that is performed to collect sensor data for use in testing and validating an ADAS of a vehicle.

In view of the above, the present inventors have devised, in accordance with a first aspect herein, a system for assessing progress of a data recording campaign performed to collect sensor data which has been recorded by a sensor data recorder mounted on a vehicle while the vehicle is being driven, the sensor data for use in testing an advanced driving assistance system (ADAS) of the vehicle, wherein the ADAS is arranged to provide driving assistance by processing sensor data being acquired by a sensor module mounted on the vehicle as the vehicle is being driven. The system includes a metadata generating apparatus and a remote metadata processing apparatus. The metadata generating apparatus is arranged to generate metadata when mounted on the vehicle and used in the data recording campaign, the metadata generating apparatus including: a data processing apparatus arranged to process data acquired by the sensor module to generate metadata for the sensor data, the metadata including classifications of at least one of: an attribute of a driving environment the vehicle was in during the acquisition of the sensor data into respective classes of a predefined set of classes of the attribute; and a driving scenario involving the vehicle which occurred during the acquisition of the sensor data into respective classes of a predefined set of driving scenario classes associated with different driving scenarios, wherein each driving scenario is associated with a respective driving maneuver performed by the vehicle or a driving maneuver performed by a second vehicle with respect to the vehicle; and a communication apparatus arranged to transmit the metadata to the remote metadata processing apparatus. The remote metadata processing apparatus includes: a data store arranged to store the metadata transmitted by the communication apparatus; and an indicator generator module arranged to determine whether the received metadata includes at least a predetermined number of classifications in at least one of: a predefined class of the set of predefined classes of the attribute, in a case where the metadata includes classifications of the attribute; and a predefined driving scenario class of the set of predefined driving scenario classes associated with different driving scenarios, in a case where the metadata includes classifications of the driving scenario. The indicator generator module is further arranged to generate, based on the determination, an indicator for use in the data recording campaign.

Furthermore, the present inventors have devised, in accordance with a second aspect herein, a metadata generating apparatus for use in a system for assessing progress of a data recording campaign performed to collect sensor data recorded by a sensor data recorder mounted on a vehicle while the vehicle is being driven, the system having a remote metadata processing apparatus. The sensor data is for use in testing an advanced driving assistance system (ADAS) of the vehicle, wherein the ADAS is arranged to provide driving assistance by processing sensor data being acquired by a sensor module mounted on the vehicle as the vehicle is being driven. The metadata generating apparatus is arranged to generate metadata when mounted on the vehicle and used in the data recording campaign, and includes a data processing apparatus arranged to process data acquired by the sensor module to generate metadata for the sensor data, the metadata including classifications of at least one: an attribute of a driving environment the vehicle was in during the acquisition of the sensor data into respective classes of a predefined set of classes of the attribute; and a driving scenario involving the vehicle which occurred during the acquisition of the sensor data into respective classes of a predefined set of driving scenario classes associated with different driving scenarios, wherein each driving scenario is associated with a respective driving maneuver performed by the vehicle or a driving maneuver performed by a second vehicle with respect to the vehicle. The metadata generating apparatus further includes a communication apparatus, which is operable to transmit the metadata to the remote metadata processing apparatus, and receive from the remote metadata processing apparatus an indicator for use in the data recording campaign, the indicator indicating a determination result of a determination made by the remote metadata processing apparatus of whether the metadata received by the remote metadata processing apparatus includes at least a predetermined number of classifications in at least one of: a predefined class of the set of predefined classes of the attribute, in a case where the metadata includes classifications of the attribute; and a predefined driving scenario class of the set of predefined driving scenario classes associated with different driving scenarios, in a case where the metadata includes classifications of the driving scenario.

The present inventors have also devised, in accordance with a third aspect herein, a metadata processing apparatus for use in a system for assessing progress of a data recording campaign performed to collect sensor data recorded by a sensor data recorder mounted on a vehicle while the vehicle is being driven. The sensor data is for use in testing an advanced driving assistance system (ADAS) of the vehicle, the ADAS being arranged to provide driving assistance by processing sensor data being acquired by a sensor module mounted on the vehicle as the vehicle is being driven. The metadata processing apparatus includes a data store which is operable to store metadata received from the metadata generating apparatus, the metadata being based on data acquired by the sensor module and including classifications of at least one of: an attribute of a driving environment the vehicle was in during acquisition of the sensor data by the sensor module into respective classes of a predefined set of classes of the attribute; and a driving scenario involving the vehicle which occurred during the acquisition of the sensor data into respective classes of a predefined set of driving scenario classes associated with different driving scenarios, wherein each driving scenario is associated with a respective driving maneuver performed by the vehicle or a driving maneuver performed by a second vehicle with respect to the vehicle. The metadata processing apparatus further includes an indicator generator module, which is arranged to determine whether the received metadata includes at least a predetermined number of classifications in at least one of: a predefined class of the set of predefined classes of the attribute, in a case where the metadata includes classifications of the attribute; and a predefined driving scenario class of the set of predefined driving scenario classes associated with different driving scenarios, in a case where the metadata includes classifications of the driving scenario. The indicator generator module is further arranged to generate, based on the determination, an indicator for use in the data-recording campaign.

In an example implementation of any of the aspects above, the sensor module may include a first sensor arranged to acquire first sensor data as the vehicle is being driven, and a second sensor arranged to acquire second sensor data as the vehicle is being driven, the second sensor being different from the first sensor. Furthermore, the ADAS may be arranged to provide driving assistance based on the first sensor data, and the metadata generating apparatus may be arranged to generate the metadata by processing the second sensor data. Each of the first sensor and the second sensor may include a camera, a Radar sensor or a LIDAR sensor.

In another example implementation of any of the aspects above, the sensor module may include a single sensor arranged to acquire the sensor data, and the ADAS and the metadata generating apparatus may be arranged to process the sensor data acquired by the single sensor. Furthermore, the single sensor may include a camera sensor, a Radar sensor, or a LIDAR sensor.

In the system of the first or third aspect or any of the example implementations thereof set out above, the sensor data may include a plurality of sensor data measurements each acquired at a different time instant during the data recording campaign, and the metadata may include a plurality of metadata data packages, the data processing apparatus being arranged to generate each metadata data package for a respective sensor data measurement of the plurality of sensor data measurements and associate the metadata data package with the respective sensor data measurement, wherein each metadata data package is generated by processing data acquired by the sensor module while the sensor data measurement is being acquired. Furthermore, each metadata data package may include a respective classification of an attribute of the driving environment the vehicle was in during the acquisition of the sensor data measurement into a respective class of the predefined set of classes of the attribute, in a case where the metadata includes classifications of the attribute; and a respective classification of a driving scenario involving the vehicle which occurred during the acquisition of the sensor data measurement into a respective class of the predefined set of driving scenario classes associated with different driving scenarios, in a case where the metadata includes classifications of the driving scenario. The indicator generator module may be arranged to determine whether the stored metadata includes at least the predetermined number of classifications by determining whether a predetermined number of metadata data packages have respective classifications satisfying a predetermined condition for at least one of: the attribute of the driving environment, in a case where the metadata includes classifications of the attribute; and the driving scenario, in a case where the metadata includes classifications of the driving scenario. In response to determining that the predetermined number metadata data packages have respective classifications satisfying the predetermined condition, the indicator generator module may be arranged to generate, as the indicator, a first instruction instructing the sensor data recorder to stop recording sensor data, the remote metadata processing apparatus may be arranged to transmit the first instruction to the vehicle, and the sensor data recorder may be arranged to respond to the first instruction by ceasing to record sensor data.

Furthermore, the indicator generator module may be arranged to determine whether a metadata data package stored in the data store satisfies a predetermined condition for at least one of the attribute in a case where the metadata includes classifications of the attribute; and the driving scenario, in a case where the metadata includes classifications of the driving scenario, in response to determining that the metadata data package does not satisfy the predetermined condition, generate, as the indicator, a second instruction instructing the sensor data recorder to delete a stored sensor data measurement associated with the metadata data package. The remote metadata processing apparatus may be arranged to transmit the second instruction to the vehicle, and the sensor data recorder may be arranged to respond to the second instruction by deleting the stored sensor data measurement associated with the metadata data package.

The sensor module may be further arranged to acquire vehicle status data including measurements of one or more of a speed of the vehicle, a yaw rate of the vehicle, a throttle setting of the vehicle, and location information of the vehicle during the acquisition of the sensor data by the sensor module, the data processing apparatus may be arranged to generate the metadata so as to further include the vehicle status data, the remote metadata processing apparatus may further include an anomaly detection module arranged to search for an anomaly in the vehicle status data using one or more predefined criteria, and the indicator generator module may be further arranged to generate a second indicator for use in the data recording campaign, the second indicator indicating that an anomaly has been detected in the vehicle status data.

The remote metadata processing apparatus may further include a dataset selection module, which is arranged to select a subset of sensor data measurements from the plurality of sensor data measurements based on the metadata and a predefined requirement. The predefined requirement may specify at least one of: a number (e.g., a required number) of sensor data measurements that have corresponding metadata data packages including a classification into a predefined class of an attribute, in a case where the metadata includes classifications of the attribute, and a number (e.g., a required number) of sensor data measurements that have corresponding metadata data packages including a classification into a predefined class of the driving scenario, in a case where the metadata includes classifications of the driving scenario.

The dataset selection module may be arranged to select the subset of sensor data measurements based on the metadata and the predefined requirement by solving, using integer programming, a system of linear equation systems subject to mathematical constraints defined by the predefined requirement, each linear equation of the linear equation system is formed based on classifications included in a respective set of metadata data packages of the plurality of respective metadata data packages. In a case where the metadata includes classifications of the attribute, at least one variable of each linear equation corresponds to a predefined class of the attribute, and a coefficient of the at least one variable of each linear equation corresponds to a number of classifications in the predefined class of the attribute indicated by the set of metadata data packages. In a case where the metadata includes classifications of the driving scenario, at least one variable of each linear equation corresponds to a predefined driving scenario class, and a coefficient of the at least one variable of each linear equation corresponds to a number of classifications in the predefined driving scenario class indicated by the set of metadata data packages.

The attribute of the driving environment of the vehicle may include at least one of: a type of one or more objects in the driving environment of the vehicle, wherein the data processing apparatus is arranged to process the data acquired by the sensor module to detect one or more objects in the driving environment of the vehicle, and to classify the detected one or more objects according to object type; a number of objects of a predefined one or more types in the driving environment of the vehicle, wherein the data processing apparatus is arranged to process the data acquired by the sensor module to detect one or more objects of the predefined one or more types, and classify the detected one or more objects according to a number of the detected one or more objects; an environment type of the driving environment of the vehicle, wherein the data processing apparatus is arranged to acquire information on the driving environment of the vehicle and classify the driving environment according to environment type; a time-of-day of the driving environment, wherein the data processing apparatus is arranged to acquire a local time of the vehicle and classify the driving environment according to the local time; and a type of weather in the driving environment of the vehicle, wherein the data processing apparatus is arranged to acquire information on a weather condition in the driving environment of the vehicle and use the acquired information on the weather condition to classify the driving environment according to weather type.

The predefined set of driving scenario classes associated with different driving scenarios include at least one of: an overtaking class associated with an overtaking maneuver performed by the vehicle; an overtaken class associated with the vehicle being overtaken by a second vehicle; an emergency braking class associated with an emergency braking performed by the vehicle; a cut-in class associated with a second vehicle on the left or right of the vehicle moving into the same lane as the vehicle; a yaw-rate-related maneuver class associated with a yaw rate of the vehicle fulfilling a predefined condition; a speed-related maneuver class associated with a speed of the vehicle fulfilling a predefined condition.

The indicator generator module may be further arranged to display the indicator on a display.

BRIEF DESCRIPTION OF THE DRAWINGS

Example implementations will now be explained in detail, by way of non-limiting example only, with reference to the accompanying figures described below. Like reference numerals appearing in different ones of the figures can denote identical or functionally similar elements, unless indicated otherwise.

DETAILED DESCRIPTION

Figure 1:
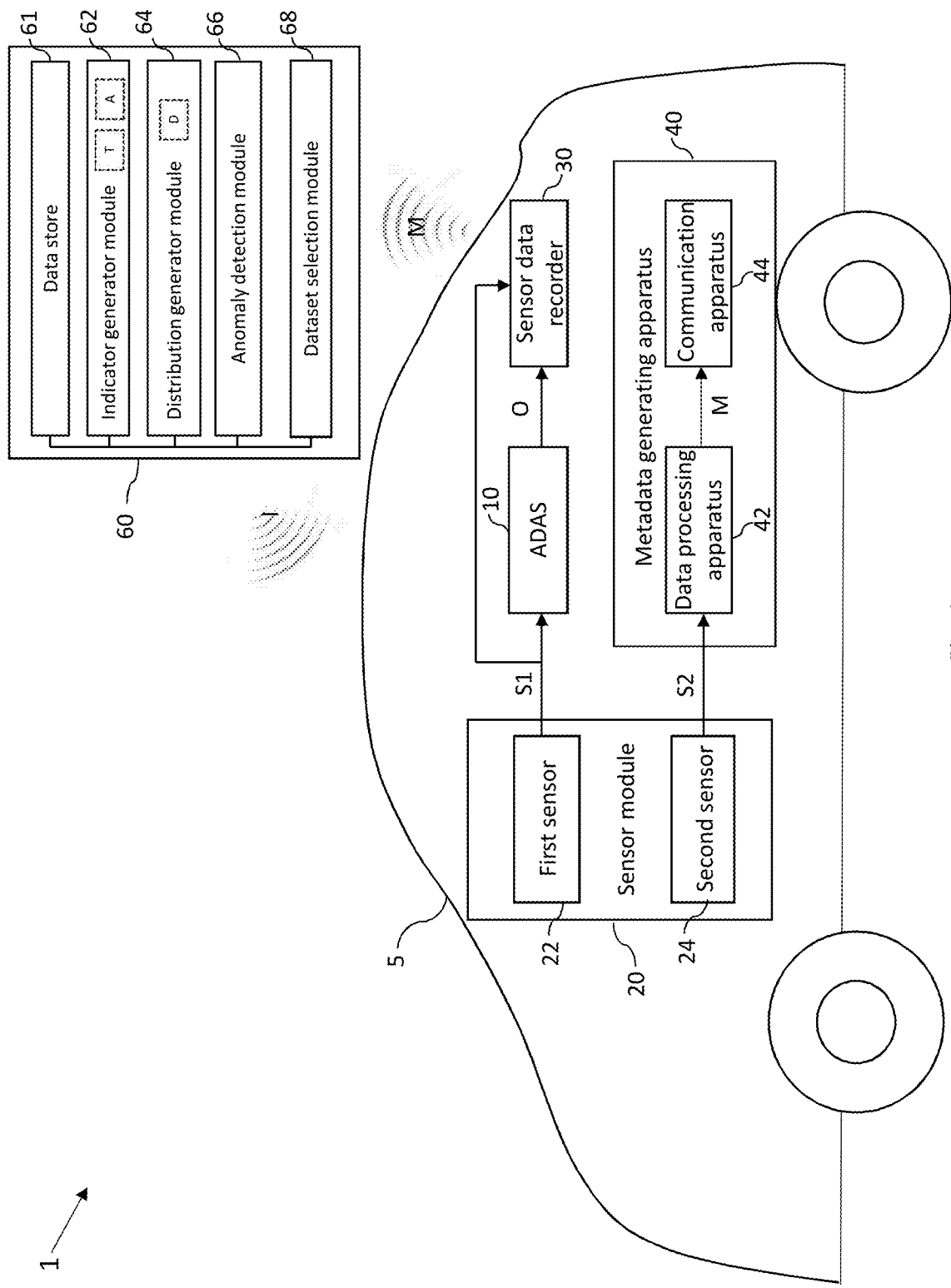
FIG. 1 is a schematic illustration of a system for assessing progress of a data recording campaign that is performed to collect sensor data for use in testing and validating an ADAS of a vehicle, in accordance with a first example implementation.

FIG. 1 is a schematic illustration of a system 1 for assessing progress of a data recording campaign according to a first example implementation. As shown in FIG. 1, a vehicle 5 includes an advanced driving assistance system (ADAS) 10, a sensor module 20 which is mounted on the vehicle 5 and includes a first sensor 22 and a second sensor 24, a sensor data recorder 30, and a metadata generating apparatus 40. The metadata generating apparatus 40 includes a data processing apparatus 42 and a communication apparatus 44. The ADAS 10 is arranged to provide driving assistance by processing sensor data acquired by the sensor module 20 as the vehicle 5 is being driven.

FIG. 1 also illustrates a remote metadata processing apparatus 60, which is remote from, and in wireless communication with, the vehicle 5. The metadata processing apparatus 60 includes a data store 61 arranged to store metadata M received from the metadata generating apparatus 40, and an indicator generator module 62. The remote metadata processing apparatus 60 may, as in the present implementation, further include a distribution generator module 64 and an anomaly detection module 66. The component modules of the metadata processing apparatus 60 may be communicatively coupled so as to be capable of communicating with one another.

The data recording campaign is performed to collect sensor data, which is recorded by the sensor data recorder 30 mounted on the vehicle 5 as the vehicle 5 is being driven. The recorded sensor data can be used for testing and validating the ADAS 10 of the vehicle 5. It should be understood that a system according to an implementation includes the data processing apparatus 42 and the remote metadata processing apparatus 60 as described herein with reference to FIG. 1, and may additionally include one or more of the other components described herein with reference to FIG. 1.

Figure 2:
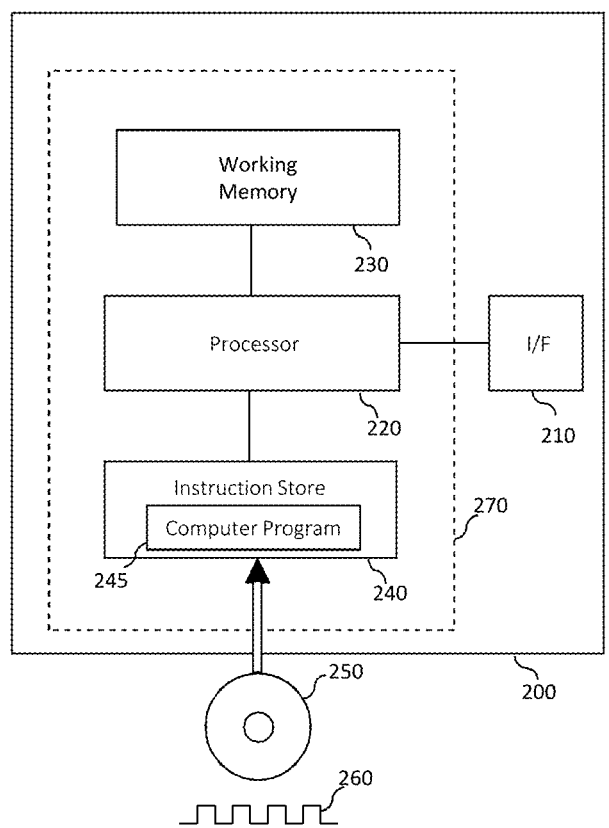
FIG. 2 is a schematic illustration of a programmable signal processing hardware, which may be configured to perform the functions of the data processing apparatus or the modules of the remote metadata processing apparatus of the first example implementation.

FIG. 2 is a schematic illustration of a programmable signal processing hardware 200 (programmable signal processing apparatus 200), which may be configured to perform the operations of the data processing apparatus 42, the ADAS 10, or one or more of the modules 61 to 66 of the remote metadata processing apparatus 60 of the present example implementation. The programmable signal processing apparatus 200 includes a communication interface (I/F) 210 for receiving input data to be processed and outputting data generated by the processing. The signal processing apparatus 200 further includes a processor 220 (e.g., a Central Processing Unit (CPU)) to process the input data, a working memory 230 (e.g., a random-access memory) and an instruction store 240 storing a computer program 245 including computer-readable instructions which, when executed by the processor 220, cause the processor 220 to perform the functions of one of the aforementioned components of the system 1 described herein. The working memory 230 stores information used by the processor 220 during execution of the computer program 245. The instruction store 240 may include a ROM (e.g., in the form of an electrically-erasable programmable read-only memory (EEPROM) or flash memory) which is pre-loaded with the computer-readable instructions. Alternatively, the instruction store 240 may include a RAM or similar type of memory, and the computer-readable instructions of the computer program 245 can be input thereto from a computer program product, such as a non-transitory, computer-readable storage medium 250 in the form of a CD-ROM, DVD-ROM, etc. or a computer-readable signal 260 carrying the computer-readable instructions. In any case, the computer program 245, when executed by the processor 220, causes the processor 220 to execute processes performed by the data processing apparatus 42, the ADAS 10, or one or more of the modules 61 to 66 of the remote metadata processing apparatus 60 of the present example implementation. It should be noted, however, that each of these components of the system 1 may alternatively be implemented in non-programmable hardware, such as an application-specific integrated circuit (ASIC).

Referring again to FIG. 1, the first sensor 22 is arranged to acquire first sensor data S1 by sensing an external (driving) environment of the vehicle 5 as the vehicle 5 is being driven. The first sensor 22 and the second sensor 24 may, as in the present example implementation, each be a camera sensor which senses light (e.g., visible light) emitted/reflected by objects in the vehicle's environment. Furthermore, the second sensor 24 is arranged to acquire second sensor data S2 as the vehicle 5 is being driven, which is indicative of the environment of the vehicle 5. The second sensor 24 may, as in the present implementation, be arranged to acquire the second sensor data S2 while the first sensor data S1 is being acquired by the first sensor 22, so that the camera sensors operate concurrently.

Thus, in the present implementation, the first sensor data S1 and the second sensor data S2 respectively include frames of video footage obtained by the sensors 22 and 24 filming the driving environment of the vehicle 5 as the vehicle is being driven during the data recording campaign.

It should be noted, however, that the first sensor 22 and the second sensor 24 are not limited to both being camera sensors, and may take other (potentially different) forms. For example, each of the first sensor 22 and the second sensor 24 may alternatively include a Radio Detection and Ranging (Radar) sensor, which is arranged to acquire Radar data as the sensor data, or a Light Detection and Ranging (LIDAR) sensor, which is arranged to acquire LIDAR data as the sensor data. Thus, the first sensor 22 may be one of a camera sensor, a Radar sensor and a LIDAR sensor, and the second sensor 24 may be one of a camera sensor, a Radar sensor and a LIDAR sensor, for example. In the present implementation, fields-of-view of both of sensors 22 and 24 are oriented in substantially similar manner relative to the vehicle 5, so as to record video of the road and/or at least some of the external surroundings of the vehicle 5.

In FIG. 1, the ADAS 10 is arranged to provide driving assistance to a driver of the vehicle 5 based on the first sensor data S1, which includes frames of video recorded by the first (camera) sensor 22. The ADAS 10 may include one or more driving assistance functionalities under development, such as adaptive cruise control, emergency brake assistance, front collision warning, lane departure warning, and lateral control and lane change assist, for example.

Furthermore, as illustrated in FIG. 1, sensor data S1 captured by the first sensor 22 is recorded by the sensor data recorder 30 while the vehicle 5 is being driven during the data recording campaign, for use in testing and validating the ADAS 10. Furthermore, while first sensor data S1 is being captured by the first sensor 22, an output O of ADAS 10 (e.g., decisions made by the ADAS 10) may be also recorded by the sensor data recorder 30. In addition, the ADAS output O may be time-synchronized with the captured first sensor data S1, in order to allow the validation of the ADAS output O against the first sensor data S1. It should be noted that during early stage ADAS development, ADAS 10 may not be fully functional. That is, although first sensor 22 may be capable of recording sensor data S1, the ADAS 10 may not be capable of performing any detection or classification on the recorded sensor data S1.

In FIG. 1, the metadata generating apparatus 40 is arranged to generate metadata M when mounted on the vehicle 5 and used in the data recording campaign. In the present example implementation, the data processing apparatus 42 of the metadata generating apparatus 40 is arranged to process the second sensor data S2 acquired by the second sensor 24 to generate metadata M for the first sensor data S1. The metadata M may, as in the present implementation, be generated for the first sensor data S1 that is acquired at substantially the same time as the second sensor data S2 that is processed by the data processing apparatus 42 to generate the metadata M. The metadata M may thus include classifications of an attribute of the driving environment the vehicle 5 was in during the acquisition of the first sensor data S1 into respective classes of a predefined set of classes of the attribute. Alternatively or in addition, the metadata M may include classifications a driving scenario involving the vehicle which occurred during the acquisition of the sensor data S1 into respective classes of a predefined set of driving scenario classes associated with different driving scenarios. Each driving scenario includes a respective driving maneuver performed by the vehicle 5 or a driving maneuver performed by a second vehicle with respect to the vehicle 5.

For example, the second sensor data S2 may, as in the present example implementation, include a plurality of second sensor data measurements each acquired at a different time instant during the data recording campaign while the vehicle is being driven during the data recording campaign. The plurality of second sensor data measurements may, as in the present example, be a plurality of images acquired by the second sensor 24 at different times (herein referred to as a plurality of image acquisitions). The metadata generating apparatus 40 may be arranged to process the image data of each of these image acquisitions to generate a respective metadata data package that includes a respective classification of the attribute of the vehicle's environment into a class of the plurality of predefined classes for the attribute, in a case where the metadata M includes classifications of the attribute. The metadata generating apparatus 40 may also be arranged to process the image data to generate a metadata data package including a respective classification of the driving scenario involving the vehicle 5 which occurred during the acquisition of the sensor data measurement into a class of a predefined set of driving scenario classes associated with different driving scenarios, in a case where the metadata M includes classifications of a driving scenario. In implementations where the metadata M includes both classifications of the attribute of the driving environment and the driving scenario, the classifications may be included in the same metadata data package, but may alternatively be included in separate metadata data packages.

In implementations where the metadata includes classifications of an attribute of the driving environment, the image data of each image acquisition may be a single frame of video footage captured by the second sensor 24, and the data processing apparatus 42 may be arranged to process each of the frames to generate a respective metadata data package. However, it should be understood that each of the image acquisitions made by the second sensor 24 need not correspond to a single video frame, and may instead include a plurality of frames. In addition, the second sensor 24 may not acquire the image data (more generally, the second sensor data) in a continuous manner, and may instead acquire second sensor data measurements only at predetermined intervals or based on the detection of certain events, for example.

In implementations where the metadata includes classifications of a driving scenario involving the vehicle 5, the data processing apparatus 42 may be arranged to process image data including a plurality of video frames in order to generate a metadata data package for the plurality of video frames, the metadata data package including a classification of the driving scenario into a driving scenario class of a plurality of predefined driving scenario classes.

Furthermore, the first sensor data S1 may, as in the present example implementation, include a plurality of image acquisitions made by the first sensor 22 at different times while the vehicle 5 is being driven during the data recording campaign, with each image acquisition including one or more frames of video footage captured by the first sensor 22. Each metadata data package generated by the metadata generating apparatus 40 is associated with a respective one of the image acquisitions made by the first sensor 22, the association being based on a comparison of timestamps, video frame identifiers or the like, which allows the metadata data packages to be correlated in time with the image acquisitions made by the first sensor 22, so that each metadata data package may include a respective classification of the attribute of the driving environment the vehicle 5 was in during the associated image acquisition made by the first sensor 22, in a case where the metadata M includes classifications of the attribute. Alternatively or in addition, each metadata data package may include a respective classification of the driving scenario involving the vehicle 5 which occurred during the acquisition of the associated image acquisition made by the first sensor 22, in a case where the metadata M includes classifications of the driving scenario.

Figure 3:
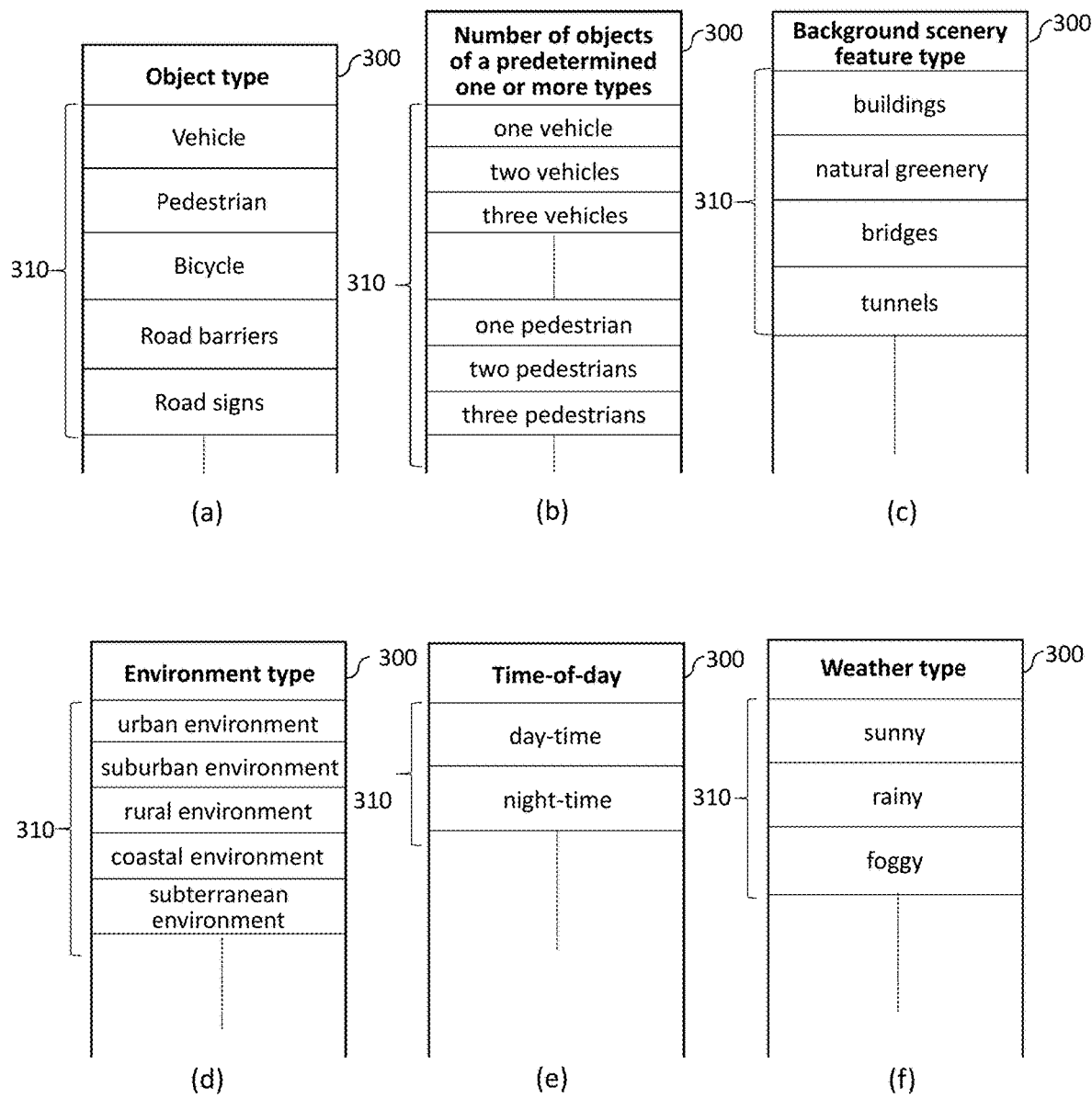
FIG. 3 illustrates examples of attributes of the driving environment that may be processed by the metadata generating apparatus of FIG. 1, together with examples of predefined classes for each attribute.

FIG. 3 illustrates examples of attributes 300 of the driving environment of the vehicle 5 that may be processed by the metadata generating apparatus 40 of FIG. 1 to generate the metadata M. FIG. 3 also illustrates some examples of predefined classes 310 for each attribute 300.

As shown in FIG. 3 example (a), the attribute 300 of the driving environment may, as in the present implementation, include a type of one or more objects in the driving environment of the vehicle 5, wherein the data processing apparatus 42 is arranged to process the data S2 acquired by the second sensor 24 to detect one or more objects in the driving environment of the vehicle 5, and to classify the detected one or more objects according to object type. In particular, the classifications of the attribute 300 in the metadata M may include classifications of a type of one or more road objects in the driving environment the vehicle 5 during the acquisition of the first sensor data S1 into a respective one of a plurality of predefined road object classes. The predefined road object classes may include one or more of a vehicle class, a pedestrian class, a bicycle class, and a road-sign class. However, additional or alternative road object classes may be included in the predefined road object classes.

Additionally or alternatively, the attribute 300 of the driving environment may include a number of objects of a predefined one or more types in the driving environment of the vehicle 5, wherein the data processing apparatus 42 is arranged to process the data S2 acquired by the second sensor 24 to detect one of or objects of the predefined one or more types, and classify the detected one or more objects according to a number of the detected one or more objects, as illustrated in FIG. 3 example (b). In the present example, the data processing apparatus 42 may process each second sensor data measurement (included in the second sensor data S2) by first detecting the objects in the driving environment of the vehicle 5 based on the second sensor data measurement. The data processing apparatus 42 may further classify each detected object as belonging to an object class of the plurality of predefined object classes. The data processing apparatus 42 may subsequently determine a number of objects belonging to each of the plurality of predefined object classes.

In the present example, where the second sensor 24 includes a camera sensor and the plurality of second sensor data measurements include a plurality of frames of a recorded video of the driving environment of the vehicle 5, any one of a number of object recognition algorithms can be used in the generation of a metadata data package (for each first sensor data measurement) that includes both the type of objects in the frame as well as the number of objects of each type in a frame. By way of example, the objection recognition algorithm be one of a You Only Look Once (YOLO) network, a Region-based Convolutional Neural Networks (R-CNN) or a Single Shot Detector (SSD) algorithm. However, another objection detection algorithm known to those versed in the art may alternatively be used. It should be noted, however, that the data processing apparatus 42 does not need to implement all of the perception functionalities analogic to ADAS, and that analytical functions and information from vehicle state machines may alternatively be used.

Although the second sensor 24 is a camera sensor in the present example, it should be noted that metadata M including classifications of the type of road object, and the number of objects of each road object type, can also be generated from the second sensor data S2 when the second sensor data S2 is Radar data acquired by a Radar sensor, or LIDAR data acquired by a LIDAR sensor. For example, in an implementation where the second sensor 24 is a Radar sensor and the second sensor data S2 is Radar data, the data processing apparatus 42 may perform object tracking and object classification based on the Radar data acquired over an extended period (e.g., over a continuous period of observation) by using, for example, a neural network, to identify and differentiate different types of road objects in the driving environment of the vehicle 5. Furthermore, road barriers and concrete curbs may also be detected using Radar data. The Radar data may, for example, include a plurality of sets of Radar data measurements, and a metadata data package may be generated for each set of Radar data measurements, each metadata package including classifications of the type of objects, and/or classifications of the number of objects of one or more predefined types, that has been detected from the set of Radar data measurements. Although more information on the driving environment may usually be extracted when the second sensor 24 takes the form of a camera sensor or a LIDAR sensor, a Radar sensor may provide more robust performance in some conditions, for example under varying ambient light conditions or under adverse weather conditions. Furthermore, a Radar system can provide accurate measurements of the distance of objects from the ego-vehicle.

In implementations such as the present implementation, where the second sensor 24 is a camera sensor, the attribute 300 of the driving environment may additionally or alternatively include a background scenery feature type, as illustrated in FIG. 3 example (c). More specifically, the classifications of the attribute 300 of the driving environment the vehicle 5 may further include classifications of a background scenery feature of the driving environment of the vehicle 5 which has been detected by the camera sensor, into one of a plurality of predefined classes associated with different background scenery feature types. The classifications of the background scenery feature type may, for example, include respective determinations of a confidence score for each of a plurality of background scenery feature type classes. Each confidence score is indicative of a likelihood that the environment of the vehicle 5 includes a background scenery feature that belongs to the background scenery feature class. In addition, the classifications of the background scenery feature may include classifications of the background scenery feature as belonging to one of the background scenery feature classes.

As an example, the metadata generating apparatus 40 may apply an image classification algorithm on at least a portion of a frame of video that has been captured by the camera sensor, in order to determine, as the metadata, confidence scores on the presence of various background feature types in the frame, such as the presence of a tree, building, tunnel and/or bridge, for example. The confidence score determined for each of a plurality of background scenery feature classes may be further used to classify the image into one of a plurality of predefined background scenery feature classes, with the output of the classification being included in the metadata. The plurality of predefined background feature classes may, for example, include at least one or more of a building class indicating that the driving environment of the vehicle 5 includes one or more buildings; a natural greenery class indicating that the driving environment of the vehicle 5 includes greenery such as one or more trees; a bridge class indicating that the driving environment of the vehicle 5 includes one or more bridges; and a tunnel class indicating that the environment of the vehicle includes one or more tunnels. However, other background feature classes may be included in the plurality of predefined background feature classes. The image classification algorithm that is used to classify the image may for example, be a convolutional neural network such as the GoogleNet network. However, other forms of pre-trained neural networks may also be used. In some cases, analytical functions may be used instead of image classification algorithms. For example, the height of the sun over the horizon may be calculated using information on time, date and GPS location of the vehicle 5.

The data processing apparatus 42 may further be arranged to monitor background feature classifications as described above over a sufficiently long period of time or to otherwise acquire information on the driving environment of the vehicle 5 and, on this basis, classify the driving environment according to environment type, as illustrated in FIG. 3 example (d). The environment type may, for example, include an urban environment, a suburban environment, a rural environment, a coastal environment, or a subterranean environment, as illustrated in FIG. 3 example (d). By way of example, repeated classifications which indicate the presence of one or more buildings in the vehicle's environment, may cause the data processing apparatus 42 to further classify the driving environment as belonging to the 'urban environment' class of environment type. Likewise, repeated classifications which indicate the presence of one or more trees in the vehicle's environment, may cause the data processing apparatus 42 to further classify the driving environment as belonging to the 'rural environment' class of environment type.

Additionally or alternatively, the attribute 300 of the driving environment may include a time-of-day of the driving environment, wherein the data processing apparatus 42 is arranged to classify the environment according to a time of day. For example, the metadata generating apparatus 40 may process each video frame to classify the image therein as belonging to one of a plurality of predefined classes associated with the time of the day, such as, for example, a day-time class and a night-time class, as illustrated in FIG. 3 example (e). Alternatively or in addition, the data processing apparatus 42 may be arranged to acquire data indicating a local time of the vehicle 5 from a clock in the sensor module 20, and classify the environment according to the local time.

Additionally or alternatively, the attribute 300 of the driving environment may include a type of weather in the driving environment of the vehicle 5, wherein the data processing apparatus 42 is arranged to classify the environment according to weather type. For example, the metadata generating apparatus 40 may classify (using a neural network, for example) each video frame as belonging to one of a plurality of predefined classes associated with different weather conditions, such as, for example, a rainy weather condition class, a foggy weather condition class and a snowing weather condition class. Alternatively or in addition, the data processing apparatus 42 may be arranged to acquire weather information on a weather condition in the environment of the vehicle 5 from the sensor module 20, and use the acquired weather information to classify the environment according to weather type, as illustrated in FIG. 3 example (f). The sensor module 20 may, for example, include or communicate with a rain sensor which is configured to detect rainfall on a windscreen or other surface of the vehicle 5, and the sensor module 20 may generate the weather information based on a detection result output by the rain sensor. The sensor module 20 may alternatively acquire the weather information wirelessly from a weather forecasting/monitoring service, for example.

Figure 4:
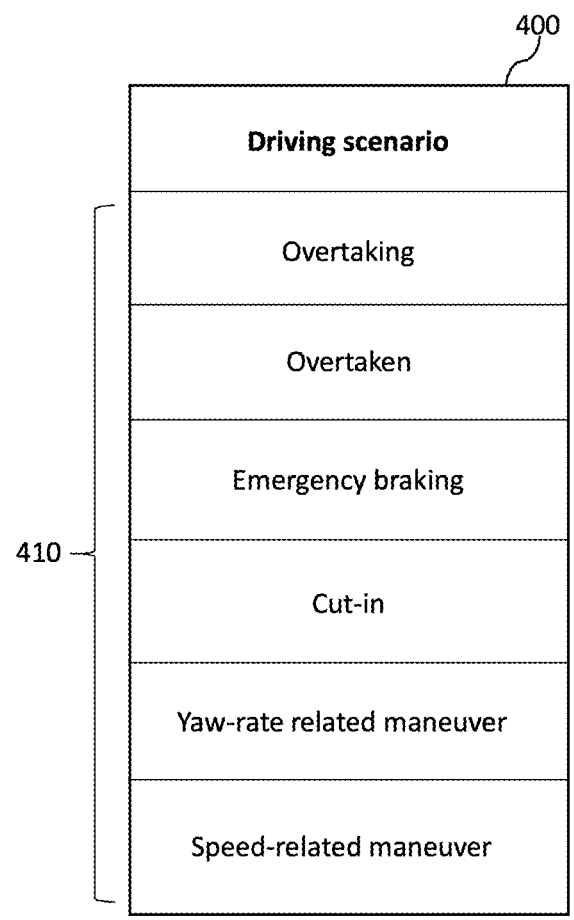
FIG. 4 illustrates an example of a predefined set of driving scenario classes associated with different driving scenarios which may be used to classify a driving scenario to generate metadata.

FIG. 4 illustrates an example of a predefined set of driving scenario classes 410 associated with different driving scenarios, which may be used to classify the driving scenario to generate metadata.

As shown in FIG. 4, the predefined set of driving scenario classes 410 associated with different driving scenarios may include an overtaking class associated with an overtaking maneuver performed by the vehicle 5. More specifically, when the second sensor 24 is a camera sensor, Radar sensor or LIDAR sensor, the second sensor data S2 acquired over a period of time may be processed by the data processing apparatus 42 to determine a driving event in which vehicle 5 overtakes a second vehicle. In particular, the data processing apparatus 42 may perform, using the second sensor data S2, object detection and/or object tracking of a second vehicle in the environment of the vehicle 5 during the capturing of the second sensor data S2. Based on the tracking of the position of the second vehicle relative to the vehicle, an overtaking event can be determined and the metadata processing apparatus 42 may generate metadata indicating a classification of the driving scenario into the overtaking class.

Alternatively or in addition, the predefined set of driving scenario classes 410 may, as shown in FIG. 4, further include an overtaken class associated with the vehicle 5 being overtaken by a second vehicle. In particular, the data processing apparatus 42 may process the second sensor data S2 using the same object detection and/or object tracking methods previously described to determine the occurrence of an event in which the vehicle 5 is overtaken by a second vehicle.

Alternatively or in addition, the predefined set of driving scenario classes 410 may, as shown in FIG. 4, further include an emergency braking class associated with an emergency braking performed by the vehicle 5. The data processing apparatus 42 may determine a classification of the driving scenario 400 into the emergency braking class by processing the second sensor 24 data using the aforementioned object detection and/or object tracking methods. However, the data processing apparatus 42 may alternatively determine a classification in the emergency braking class based on speed data of the vehicle 5, as obtained by a speed sensor, or any other suitable means.

Alternatively or in addition, the predefined set of driving scenario classes 410 may, as shown in FIG. 4, further include a cut-in class associated with a second vehicle on the left or right of the vehicle 5 moving into the same lane as the vehicle 5. In particular, the data processing apparatus 42 may process the second sensor data S2 using the same object detection and/or object tracking methods previously described to determine and classify the occurrence of an event in which a second vehicle on the left or right of the vehicle 5 moves into the same lane as the vehicle 5.

Alternatively or in addition, the data processing apparatus 42 may, in some implementations, be configured to receive measurements of a yaw-rate of the vehicle 5, and the predefined set of driving scenario classes may, as shown in FIG. 4, further include a yaw-rate-related maneuver class associated with a yaw rate of the vehicle 5 fulfilling a predefined condition. For example, the data processing apparatus 42 may be configured to receive yaw-rate measurements for the vehicle 5 over a period of time, and classify the driving scenario as belong to a yaw-rate related class when the yaw-rate of the vehicle 5 is determined to meet a predefined condition for the yaw-rate. This predefined condition may for example to be the detection of yaw-rate values exceeding a predefined yaw-rate value for longer than a predetermined period of time (which may occur when the vehicle is being maneuvered around a sharp bend, for example) but may more generally be any condition specified for the yaw-rate.

Alternatively or in addition, the data processing apparatus 42 may in some implementations be configured to receive measurements of a speed of the vehicle 5, and the predefined set of driving scenario classes may, as shown in FIG. 4, further include a speed-related maneuver class associated with a speed of the vehicle fulfilling a predefined condition. For example, the data processing apparatus 42 may be configured to receive speed measurements for the vehicle 5 over a period of time, and classify the driving scenario 400 into a speed-related class when the speed of the vehicle 5 is determined to meet a predefined condition. The predefined condition may for example, be the detection of a speed of the vehicle 5 exceeding a predetermined speed, but may be any condition defined for speed.

It should be noted that that the different driving scenarios are not limited to the aforementioned examples, and may include other driving scenarios corresponding to driving maneuvers performed by the vehicle 5 or driving maneuvers performed by a second vehicle with respect to the vehicle 5.

Figure 5:
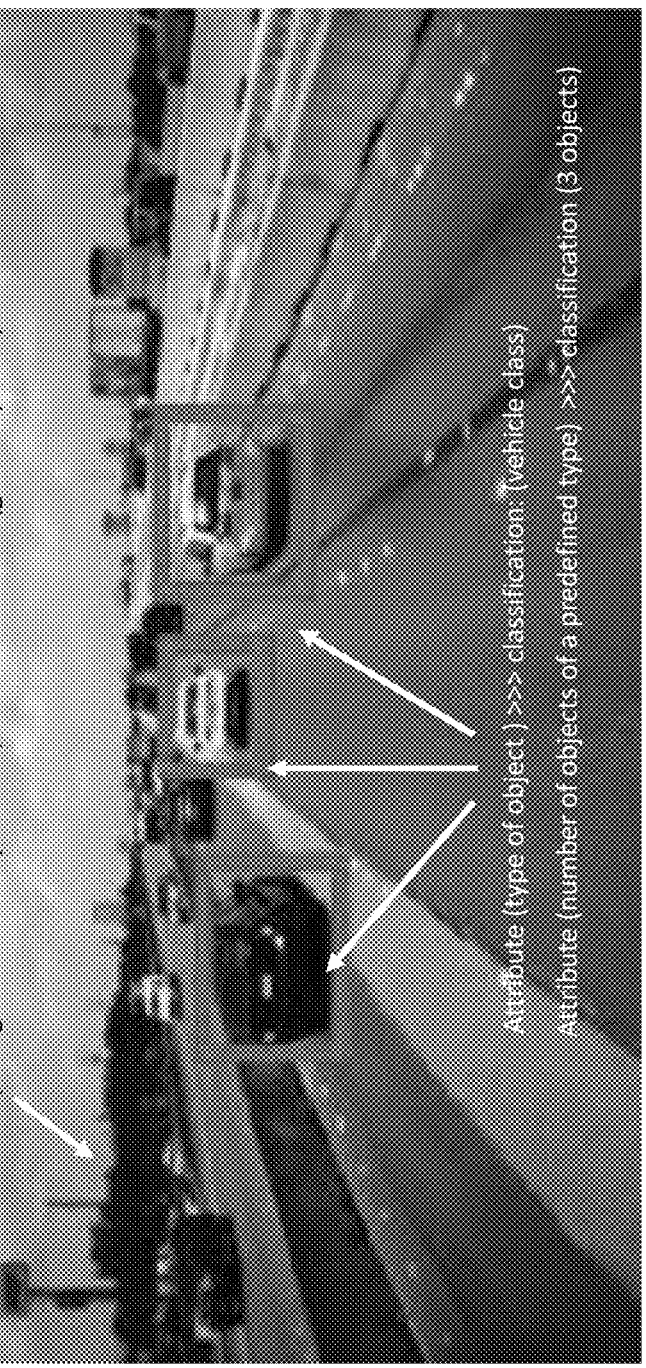
FIG. 5 illustrates a frame of an image, which may be processed by the metadata generating apparatus of FIG. 1, with annotations added to illustrate examples of classifications described herein.

FIG. 5 illustrates a video frame which may be processed by the data processing apparatus 42 of FIG. 1 to generate classifications of an attribute 300 of the driving environment. In the present example implementation, the video frame is the second sensor data measurement that is processed by the data processing apparatus 42 to generate metadata M (in the form of a metadata data package) for the frame. As shown in FIG. 5, the data processing apparatus 42 may process the video frame using the aforementioned techniques to determine a classification for attribute defined using one or more of the environment features shown in FIG. 3. Each classification is generated when the data processing apparatus 42 classifies the video frame into a class of a predefined set of classes for a particular attribute of the driving environment. For instance, in the example in FIG. 5, the data processing apparatus 42 determines, based on the illustrated video frame, that the image contains objects belong to the "vehicle" class shown in FIG. 3 example (a). Furthermore, the data processing apparatus 42 determines that the vehicles in the frame belong to the "three vehicles" class shown in FIG. 3 example (b), as well as a classification that the background scenery in the frame contains "natural greenery", and a classification of the time of the day being day-time.

Referring again to FIG. 1, the metadata generating apparatus 40 further includes a communication apparatus 44, which is arranged to transmit the generated metadata M to the remote metadata processing apparatus 60, while the vehicle 5 is being driven during the data recording campaign. The communication apparatus 44 may, as in the present example, include a transmitter arranged to wirelessly transmit the metadata M to the metadata processing apparatus 60 via a wireless network that is connected to the Internet. The wireless network may be a cellular network, such as a 3G, 4G or 5G network, for example. The metadata processing apparatus 60 is a remote computing device/system, which may, as in the present implementation, be a cloud server of a cloud computing system, for example, but may alternatively be a dedicated server arranged to store and process the metadata M.

In the present example implementation, the metadata data packages may be sent to the remote metadata processing apparatus 60 in real-time, for example through a live data stream, in order to allow real-time reporting of the type of driving environment in which the ADAS 10 under development is being tested, as well the type of driving environments for which data has been has been recorded during the data recording campaign. Furthermore, each metadata data package that is sent to the remote metadata processing apparatus 60 may be small enough in size so that data can be sent even on a low-bandwidth data connection. As a non-limiting example, each metadata data package may be limited to being under one kilobyte in size. As such, assuming that the second sensor 24 includes a camera sensor that captures images at 30 frames per second, then only 1.8 megabytes of metadata needs to be sent to the remote metadata processing apparatus for 60-seconds-worth of video recorded by the sensor data recorder 30. In addition, the video frames captured by the second sensor 24 may not need be stored to the sensor data recorder 30 and can be deleted as soon as the metadata data packages are generated from the video frames.

In FIG. 1, the remote metadata processing apparatus 60 is connected to the Internet and includes a data store 61 which is arranged to store the metadata transmitted by the communication apparatus 44 on the vehicle 5.

As shown in FIG. 1, the remote metadata processing apparatus 60 further includes an indicator generator module 62 arranged to determine whether the received metadata M includes at least a predetermined number of classifications in at least one of: a predefined class of the set of predefined classes 310 of the attribute 300, in a case where the metadata M includes classifications of the attribute 300; and a predefined driving scenario class of the set of predefined driving scenario classes 410 associated with different driving scenarios, in a case where the metadata M includes classifications of the driving scenario 400. The indicator generator module 62 further generates, based on the determination, an indicator T for use in the data recording campaign. The predetermined number of classifications against which the metadata M is evaluated may be representative of a requirement defined at the remote metadata processing apparatus 60 regarding the type of sensor data that needs to be captured by the sensor data recorder 30. The requirements may define, for example, the amount of sensor data (e.g., the number of video frames in the present example) that needs to be recorded for each of a variety of different driving environments and/or driving scenarios.

In the present example implementation, the first sensor data S1 includes a plurality of first sensor data measurements each acquired at a different time instant during the data recording campaign, and the second sensor data includes a plurality of second sensor data measurements. The metadata includes a plurality of metadata data packages, each generated for a respective first sensor data measurement of the plurality of first sensor data measurements and associated with the first sensor data measurement. Each metadata data package is generated by processing a second sensor data measurement acquired by the sensor module at substantially the same time as the acquisition of the first sensor data measurement. Each metadata data package thus includes a classification of each of one or more attributes, into a respective class of the plurality of predefined classes of the attribute, of an environment the vehicle 5 was in during the acquisition of the first sensor data measurement, in a case where the metadata M includes classifications of the attribute 300. Alternatively or in addition, each metadata data package may further include a classification of a driving scenario 400 involving the vehicle 5 which occurred during the acquisition of the sensor data measurement into a class of a predefined set of driving scenario classes 410 associated with different driving scenarios, in a case where the metadata M includes classifications of the driving scenario 400. In this implementation, the indicator generator module 62 may determine whether the received metadata M includes at least the predetermined number of classifications for the prescribed class by determining whether a predetermined number of metadata data packages have classifications satisfying a predetermined condition for at least one of: the attribute 300 of the driving environment in a case where the metadata M includes classifications of the attribute 300; and the driving scenario 400, in a case where the metadata M includes classifications of the driving scenario 400.

In a case where the metadata M includes classifications of the attribute 300, the predetermined condition for the one or more attributes 300 of the driving environment, may as in the present example, be the metadata data package indicating a specific classification for the attribute. For example, assuming that a requirement for the data recording campaign is for the sensor data recorder 30 to record at least X number of video frames, each video frame having Y number of vehicles, Z number of pedestrians and is recorded at night-time, then the indicator generator module 62 may determine, based on metadata M received at the remote metadata processing apparatus 60, whether at least X number of metadata data packages (assuming one metadata data package is generated for each frame) have classifications of Y number of vehicles (for the attribute 300 of the number of objects of a vehicle type), Z number of pedestrians (for the attribute 300 of the number of objects of a pedestrian type) and a night-time classification (for the attribute 300 of a time-of-day). Although a specific example is used in terms of the predetermined conditions for the one or more attributes, it should be apparent that the requirement for the data recording campaign can be defined in any appropriate way for any number of attributes 300. In addition, the predetermined condition for the attribute 300 does not need to be the metadata data package containing a classification in a prescribed class for the attribute 300. Rather, the predetermined condition may instead derive from a prescribed class 310 associated with the attribute 300. For example, instead of specifying that the metadata data package should contain a classification of W number of pedestrians, the predetermined condition might specify that the classification included in the metadata data package meet the condition of at least, or at most, W number of pedestrians.

Similarly, in a case where the metadata M includes classifications of the driving scenario 400, the predetermined condition for the driving scenario 400, may as in the present example, be the metadata data package indicating a specific classification for the driving scenario 400. For example, assuming that a requirement for the data recording campaign is for the sensor data recorder 30 to record at least a prescribed number of instances where the vehicle 5 overtakes another vehicle during the recording campaign, then the indicator generator module 62 may determine, based on metadata M received at the remote metadata processing apparatus 60, whether at least a predefined number of metadata data packages have a classification in the overtaking driving scenario class that is associated with an overtaking maneuver performed by the vehicle 5.

Furthermore, in implementations where the metadata M includes a classification of an attribute 300 of the driving environment as well as a classification of the driving scenario 400, the predetermined condition satisfied by the predetermined number of metadata data packages, may be defined in terms of both the attribute 300 and the driving scenario 400. That is, the predetermined condition may require at least a predetermined number of metadata packages to satisfy both a predetermined condition for the attribute 300 of the driving environment and also a predetermined condition for the driving scenario 400. A predetermined condition defined for both the attribute 300 and the driving scenario 400 may be understood to correspond to a specific driving scenario occurring in a specific driving environment. In particular, the predetermined condition may specify at least a predefined number of metadata packages each having a classification in a prescribed class 410 of the driving scenario 400 and a classification in a prescribed class 310 of the attribute 300, wherein the classification in the prescribed class 410 of the driving scenario 400 and the classification in the prescribed class 310 of the attribute 300 are determined by the data processing apparatus 42 based at least in part on common second sensor data S2. For example, in the case where the second sensor is a camera, and the second sensor data S2 are video frames, the classification in the prescribed class 410 of the driving scenario 400 and the classification in the prescribed class 310 of the attribute 300 may be determined by the data processing apparatus 42 at least in part on one or more common video frames, in order to determine the occurrence of a driving scenario corresponding to the prescribed class 410 of driving scenario, in a driving environment corresponding the prescribed class 310 of the attribute. Non-limiting examples of a predetermined condition defined with respect to both an attribute 300 of the driving environment and a driving scenario 400 may include a predetermined condition which requires at least a predetermined number of metadata packages each including classifications indicative of an overtaking event occurring in an urban environment, or at least a predetermined number of metadata packages each including classifications indicative of an emergency braking event occurring in rainy weather conditions. However, the predetermined conditions are by no means limited to the examples provided, and may be based on any suitable criteria defined with regard to the attribute 300 and the driving scenario 400.

Referring again to FIG. 1, the (optional) distribution data generator module 64 is arranged to generate distribution data D indicative of a distribution of the classifications of the attribute 300 among a plurality of predefined classes 310 of the attribute 300, in a case where the metadata M includes classifications of the attribute 300. Alternatively or in addition, the distribution data generator module 64 is arranged to generate distribution data D indicative of a distribution of the classifications of the driving scenario 400 among a plurality of predefined driving scenario classes 410, in a case where the metadata M includes classifications of the driving scenario 400. This distribution data D may help a person monitoring the data recording campaign to visualize the types of driving environments for which sensor data has been collected during the data recording campaign. For example, where the metadata M includes classifications of the type of one or more road objects, the classification distribution module 64 may, for example, generate, as the distribution data D, data indicative of a number of classifications made in each of the plurality of predefined road object type classes. For example, in the present implementation, the distribution data D may be further indicative of the number of video frames that contain an object that has been classified by the metadata generating apparatus 40 as belonging to a particular object class. For example, the distribution data may indicate that X video frames contain one or more vehicles, Y frames contain one or more pedestrians and Z frames contain one or more bicycles.

Furthermore, in the present implementation, where the second sensor 2 is a camera sensor, and a classification of the number of objects of each of the plurality of predefined object classes is determined for each video frame captured by the camera sensor, the distribution data D may be indicative of respective number of video frames that have been classified as belong to each of the predefined object type classes and "number of objects" classes (e.g., a "video frames with 2 vehicles and 2 pedestrians" class, "video frames with 2 vehicles and 1 pedestrian" class, "video frames with 3 pedestrians and 1 bicycle" class, etc.). In implementations where the metadata M includes classifications of a background scenery feature, the distribution data D may further be indicative of the number of video frames that have been classified as having a background scenery feature belonging to a prescribed one of the background scenery classes. In implementations where the metadata M includes classifications of a time-of-day of the driving environment, the distribution data D may be indicative of the number of video frames that have been classified as belonging to a prescribed one of the classes associated with time-of-day. In implementations where the metadata M includes classifications of a weather type in the driving environment, the distribution data D may include data indicative of the number of video frames that have been acquired for each of a plurality of different weather type classes.

In some implementations, the distribution data D may be indicative of the number of metadata data packages (and hence the number of first sensor data measurements) that have classifications satisfying a predetermined condition for the attribute of the driving environment. The predetermined condition for the attribute 300 may be the metadata data package indicating a specific classification for the attribute. However, in some implementations, the predetermined condition may also derive from a predefined class associated with the attributes. For example, rather than specifying that the metadata data package may contain a classification of W number of pedestrians, the predetermined condition might specify that the metadata data package contains a classification that fulfils the requirement of at least W number of pedestrians. In addition, distribution data D may be indicative of the number of frames of images that satisfy multiple predetermined conditions specified for multiple respective attributes 300. For example, the distribution data D may be indicative of the number of frames which have, in each frame, X number of vehicles, Y number of pedestrians and having green scenery as a background feature.

Furthermore, in implementations where the metadata includes classifications of the driving scenario 400, the distribution data D may be indicative of the number of metadata data packages (and hence the number of first sensor data measurements) that have classifications satisfying a predetermined condition for the driving scenario 400. The predetermined condition for the driving scenario 400 may be the metadata data package indicating a specific classification for the driving scenario 400. For example, the distribution data may be indicative of the number of metadata data packages including a classification in the overtaking driving scenario class, the number of metadata data packages including a classification in the emergency braking driving scenario class, and/or the number of metadata data packages including a classification in the speed-related maneuver driving scenario class, as described in previous examples. In addition, in cases where the metadata includes classifications of both an attribute 300 and a driving scenario 400, the predetermined condition in terms of both the attribute 300 and driving scenario 400 in the same way as discussed in previous examples. For example, the distribution data D may be indicative of the number of metadata data packages having classifications indicative of an overtaking maneuver being performed by the vehicle 5 in an urban setting, or indicative of the number of metadata data packages having classifications indicative of an emergency braking maneuver being performed in rainy weather conditions. It should be understood that the predetermined condition is not limited the aforementioned, and may be defined in any suitable manner based on the attribute 300 (more specifically, one or more predefined classes of the attribute 300) and driving scenario 400 (specifically, one or more predefined classes of the driving scenario 400).

Figure 6:
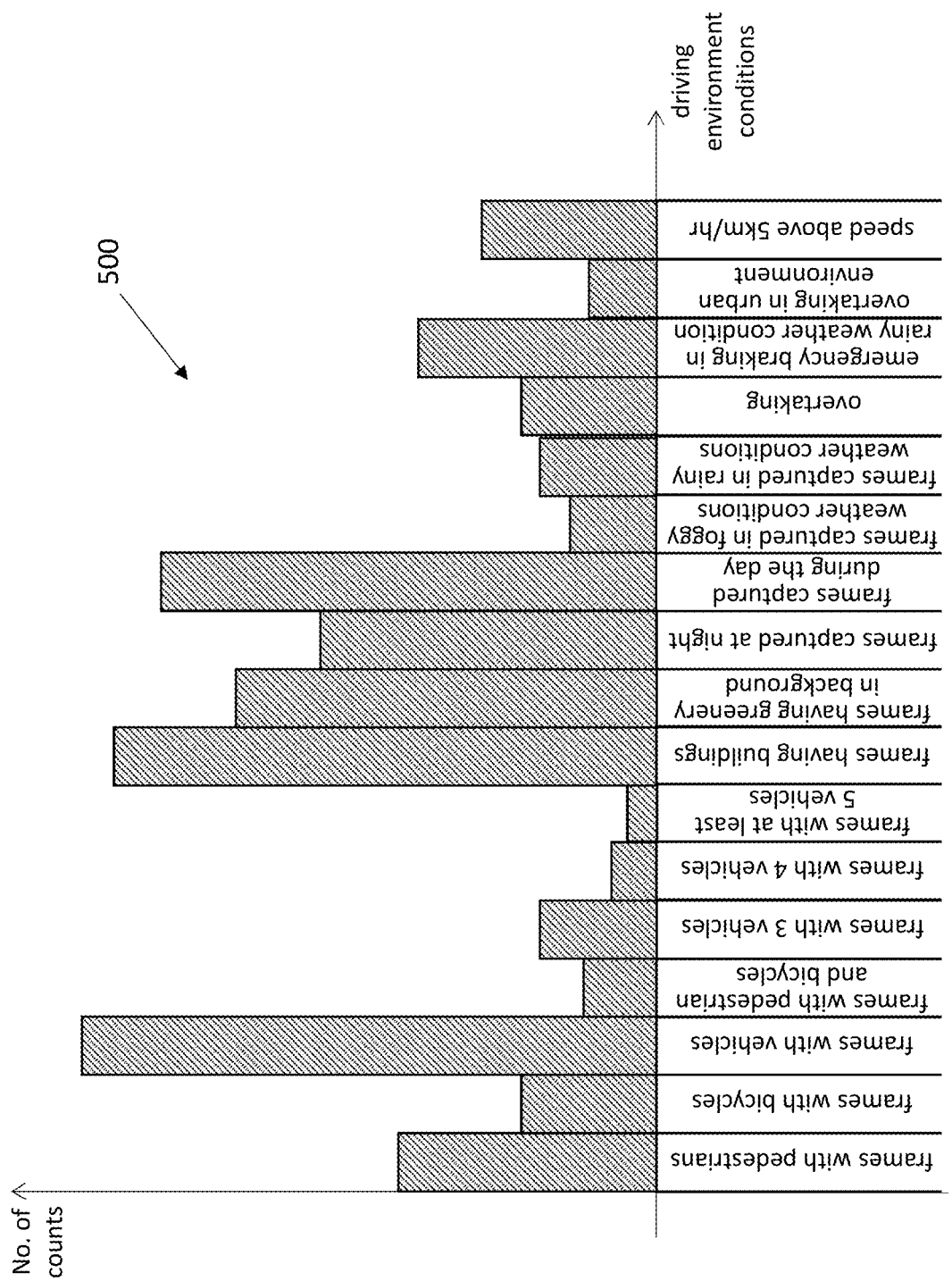
FIG. 6 is an illustration of an example distribution data in the form of a histogram, which is generated by the distribution data generator module of the remote metadata processing apparatus of the first example implementation.

FIG. 6 is an example illustration of distribution data 500 generated by the distribution generator module 64 (distribution data generator module 64) of the remote metadata processing apparatus 60. In FIG. 6, the distribution data 500 is presented in the form of a histogram but may be presented graphically in any form suitable for displaying the distribution of classifications among the various predefined classes of the attributes 300. The bins along the X-axis of FIG. 6 correspond to different driving environments/driving scenarios, which may correspond directly to the predefined classes for the attributes/driving scenarios but may also correspond to predetermined conditions that are based on the predefined classes for the attributes/driving scenario. In the example of FIG. 6, the Y-axis denotes the number of counts that fulfil the particular driving environment specified by each bin along the X-axis. It should be understood that the different driving environment conditions/driving scenarios given by the bins on the X-axis of FIG. 6 are merely examples and that other driving conditions/driving scenarios may alternatively instead be specified.

In a case where the metadata includes classifications of an attribute 300 of the driving environment, an indicator T that is generated by the indicator generator module 62 (when the indicator generator module 62 determines the metadata to include at least a predetermined number of classifications for a predefined class 310 of an attribute 300) may, for example, indicate that enough sensor data has been recorded for the particular class 310 of the attribute 300. Furthermore, the indicator T may, for example, be transmitted to a display device of one or more persons overseeing the data recording campaign, for example a driver of the vehicle 5 or a person who is remotely monitoring the progress of the data recording campaign. Similarly, in a case where the metadata includes classifications of a driving scenario 400, an indicator T that is generated by the indicator generator module 62 (when the indicator generator module 62 determines the metadata M to include at least a predetermined number of classifications for a predefined class 410 of a driving scenario 400) may, for example, indicate that enough sensor data has been recorded for the particular class 410 of the driving scenario 400. Furthermore, the indicator T may, for example, be transmitted to a display device of one or more persons overseeing the data recording campaign.

By monitoring the distribution of the classifications obtained from the metadata M received from the vehicle 5, adjustments can be made to the data recording campaign to allow data to be collected more efficiently. For example, if it has been determined (based on the distribution data D, or based on a generated indicator T) that sufficient sensor data has been acquired for a certain attribute of the driving environment or driving scenario, then the driving route can be adjusted for the next part of the data-collection campaign, in order to focus on collecting sensor data for other types of driving environments or driving scenarios. In some implementations, when it is determined that the metadata M includes at least a prescribed number of classifications for a predefined class 310 of an attribute 300, or at least a prescribed number of classifications for a predefined driving scenario class 410 of a driving scenario 400, the indicator generator module 62 may be further arranged to generate, as the indicator T, an instruction I instructing the sensor data recorder 30 to stop recording, and the remote metadata processing apparatus 60 may be arranged to transmit the instruction I to the vehicle 5. The aforementioned features are therefore advantageous in that they allow the data recording campaign to be efficiently performed while reducing the amount of distance that needs to be driven to collect the required data for testing and validation of the ADAS 10. As such, rather than defining a requirement in terms of the distance that needs to be driven for the data recording campaign, the requirement can be defined in terms of the amount of data (e.g., video frames) that needs to be captured for different driving conditions and environments.

In some implementations, the indicator generator module 62 may be arranged to determine whether a metadata data package (generated for a plurality of video frames captured by the first sensor in the present example) received from the communication apparatus 44 satisfies a predetermined condition for at least one of: the attribute 300 in a case where the metadata M includes classifications of the attribute 300; and the driving scenario 400, in a case where the metadata M includes classifications of the driving scenario 400. In response to determining that the metadata data package does not satisfy the predetermined condition, the indicator generator module 62 may be arranged to generate, as the indicator D, an instruction I instructing the sensor data recorder 30 at the vehicle 5 to delete the first sensor data S1 for which the metadata data package has been generated, and the remote metadata processing apparatus 60 may be arranged to transmit the instruction I to the vehicle 5. The predetermined condition for the attribute 300 (in a case where the metadata M includes classifications of the attribute) and/or driving scenario 400 (in a case where the metadata M includes classifications of the driving scenario 400) may be the same as previously defined, namely, the metadata data package including a specific classification for the attribute 300 and/or driving scenario 400. However, more generally, the predetermined condition may be the metadata data package fulfilling a predetermined condition based a specific class 310 for the attribute (e.g., instead of specifying W number of vehicles, the condition might specify at least W number vehicles) in the case where the metadata includes classification of the attribute 300. Alternatively or in addition, the predetermined condition may be the metadata data package fulfilling a predetermined condition based a specific driving scenario class 410. Furthermore, in some implementations, the predetermined condition may be defined for both an attribute 300 and the driving scenario, in the same manner as described in previous implementations. Accordingly, the remote metadata processing apparatus 60 of the present implementation is able to evaluate the metadata data packages generated for frames of images that have been recorded by the sensor data recorder 30, and determines if the recorded frames contain "interesting" scenarios of the type required for testing or training the ADAS 10. If the frames of images do not contain scenarios of the type that is required, the recorded frames can immediately be deleted from the sensor data recorder 30, in order to free up storage space (e.g., HDD space). This allows the data recording campaign to be carried out more efficiently.

In addition to recording sensor data regarding the types of road conditions or driving environment in which the vehicle 5 has been driven, it may also be necessary or desirable to accurately record information on the status of the vehicle 5 itself, in order to acquire all the necessary data for validation of the ADAS 10. Accordingly, in some implementations, the sensor module 20 may further include a vehicle data acquisition module (not shown in FIG. 1), which is arranged to acquire vehicle status data of one or more of: a speed of the vehicle 5, a yaw rate of the vehicle 5, a throttle setting of the vehicle 5 and location information of the vehicle 5 during the acquisition of the first sensor data S1 by the first sensor 22. The sensor data recorder 30 may be further arranged to record the vehicle status data. In these implementations, the metadata M may further include the vehicle status data. In addition, in these implementations, the metadata processing apparatus 60 may further include an anomaly detection module 66, as shown in FIG. 1, which is arranged to identify an anomaly in the vehicle status data using one or more predefined criteria. The indicator generator module 62 may be further arranged to generate a second indicator A for use in the data recording campaign, the second indicator A indicating that an anomaly has been detected in the vehicle status data. The one or more predefined criteria for identifying the anomaly in the vehicle status data may, for example, be based on expected measurements for the vehicle status data, and may be defined in any way suitable. The anomaly that is identified may be the result of a mistake in the set-up of the equipment for measuring and recording the vehicle status data, such as, for example, wrong calibration of measurement devices, or corrupted measurements due to mixed signals, hardware failure or human error. In this regard, by sending metadata M that also include vehicle status data of the aforementioned types, an anomaly or problem in the recorded vehicle status data can be identified with little delay, and the indicator A can be generated and provided to the relevant personnel (such as, for example, the driver of the vehicle 5) to highlight the problem and allow the cause of the anomaly to be promptly resolved.

The metadata M received by the metadata processing apparatus 60 can also be used to efficiently select ground-truth data for training the ADAS 10. In particular, by automatically generating a metadata data package for each first sensor data measurement (one or more video frames in the present example) during the data recording campaign, the amount of data that needs to be manually labelled by humans is significantly reduced, and the metadata data package generated for each of the first sensor data measurements can be used to select a set of first sensor data measurements that can be used to form the ground-truth data set for training the ADAS 10.

Accordingly, in some implementations, the metadata processing apparatus 60 may also include a dataset selection module 68, as illustrated in FIG. 1, which is arranged to select a subset of first sensor data measurements from the plurality of first sensor data measurements based on the metadata M and a predefined requirement. The predefined requirement may specify a required number of sensor data measurements that have corresponding metadata data packages including a classification into a prescribed class 310 of the attribute 300, in a case where the metadata M includes classifications of the attribute 300. Alternatively or in addition, the predefined requirement may specify a required number of sensor data measurements that have corresponding metadata data packages including a classification into a prescribed class of the driving scenario 400, in a case where the metadata M includes classifications of the driving scenario 400. In some implementations, integer programming may be used to optimize the selection of the subset of the first sensor data measurements, in order to select the minimum number of first sensor data measurements (e.g., the minimum number of video frames) that allow the predefined requirement to be satisfied.

More specifically, the dataset selection module may, as in the present example implementation, be arranged to select the subset of sensor data measurements based on the metadata and the predefined requirement, by solving, using integer programming, a system of linear equation systems subject to mathematical constraints defined by the predefined requirement. Each linear equation of the linear equation system is formed based on classifications included in a respective set of metadata data packages of the plurality of respective metadata data packages. In particular, in a case where the metadata M includes classifications of the attribute 300, at least one variable of each linear equation corresponds to a predefined class of the attribute 300, and a coefficient of the at least one variable of each linear equation corresponds to a number of classifications in the predefined class of the attribute 300 indicated by the set of metadata data packages. Furthermore, in a case where the metadata M includes classifications of the driving scenario 400, at least one variable of each linear equation corresponds to a predefined driving scenario class 410, and a coefficient of the at least one variable of each linear equation corresponds to a number of classifications in the predefined driving scenario class indicated by the set of metadata data packages.

As an example, in one implementation where the metadata M includes classifications of an attribute of the environment, the plurality of sensor data measurements may be divided in subsets of sensor data measurements, each subset being referred to as a data log, and the dataset selection module 68 may generate, based on the metadata data package for each sensor data measurement, classification distribution data for each data log that is indicative of the number of sensor data measurements that have a classification in a predefined class 310 of the attribute 300. The dataset selection module 68 may further use integer programming to select, based on the classification distribution data, a set of data logs that satisfy the predefined requirement. As a non-limiting example, the distribution data for each of z number of data log, $Log_1$, $Log_2$, ... $Log_z$, may include a linear equation defining the number of frames that have a classification in two or more predefined classes 310 (for one or more attributes 300), such as for example, $$Log_1 = 3p + 4b + c$$
$$Log_2 = 5p$$
$$\vdots$$
$$Log_z = 5p + 5b + 5c$$

wherein p, b, c are variables respectively representing the number of frames with one or more pedestrians, the number of frames having one or more bicycles, and the number of frames having both bicycles and pedestrians. Although three variables are defined in the set of linear equations shown above, it should be understood that other variables representing predefined conditions that are based on the predefined classes 310 of the one or more attributes 300 can also be used. The predefined requirement that needs to be satisfied by the selected data logs may, as in the present example, specify at least 10 frames with pedestrians, and 50 frames with bicycles. This predetermined requirement can be defined as the mathematical constraints under which the minimization of the function $f(a, b, \ldots, z)$ is to be performed in order to select the least number of data logs that satisfy the predetermined requirement, wherein $$f(a, b, \ldots, z) = a * Log_1 + b * Log_2 + \ldots + z * Log_3$$

and wherein a, b, ..., z are binary values which are to be determined in the minimization process. The solution to the minimization $\min(f(a, b, \ldots, z))$, which is an integer programming problem, may, as in the present implementation, be determined using the simplex algorithm. The determined values of a, b, z indicate which data logs need to be selected in order to satisfied the predetermined requirement using the minimum number of selected data logs.

In the aforementioned implementations, the sensor module 20 includes a first sensor 22 and a second sensor 24, such that the metadata M that is generated for the first sensor data S1 is based on the processing of second sensor data S2 that was acquired by the second sensor 24 at substantially the same time as the acquisition of the first sensor data S1 by the first sensor 22. However, it should be understood that the sensor module 20 does not need to have two sensors. In particular, in some implementations, the sensor module 20 may instead only have the first sensor 22, and the ADAS 10 and the metadata generating apparatus 40 may be arranged to process the sensor data acquired by the first sensor 22.

Figure 7:
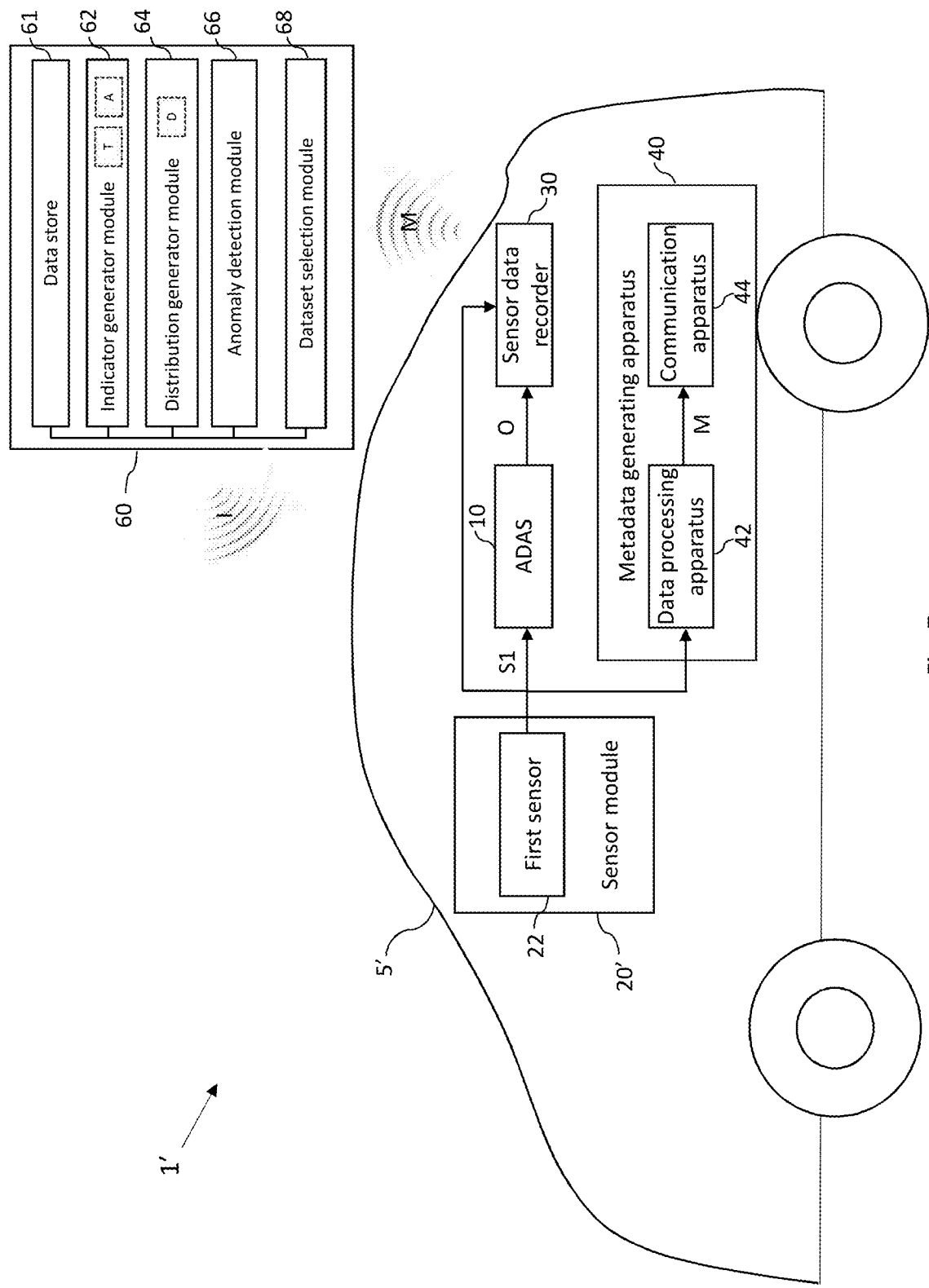
FIG. 7 is a schematic illustration of a variant of the system shown in FIG. 1 for assessing progress of a data recording campaign, in accordance with a second example implementation.

FIG. 7 is a schematic illustration of a system 1' for assessing progress of a data recording campaign, in accordance with a second example implementation. The system 1' of FIG. 7 differs from the system 1 of FIG. 1 only by the configuration of the sensor module 20', which includes a single sensor in the form of first sensor 22, instead of the two sensors 22 and 24 shown in FIG. 1. The variant system 1' shown in FIG. 7 includes the same metadata generating apparatus 40 and the remote metadata processing apparatus 60 as described in relation to FIG. 1, with the only difference being that the metadata generating apparatus 40 in FIG. 7 is arranged to generate metadata M' for the first sensor data S1, by processing the first sensor data S1 provided by the first sensor 22. In particular, the data processing apparatus 42 may generate the metadata M' for the first sensor data S1 by processing the first sensor data S1 in exactly the same way that the data processing apparatus 42 processes the second sensor data S2 for the implementation in FIG. 1. In other words, in the system 1' of FIG. 7, the first sensor 22, ADAS 10, sensor data recorder 30, metadata generating apparatus 40, and the remote metadata processing apparatus 60 (including the indicator generator module 62, the distribution data generator module 64, anomaly detection module 66 and dataset selection module 68) work in exactly the same manner as described for the corresponding labelled components, and all examples and implementations described in relation to these components should be understood to be examples and implementations of the system 1' in FIG. 7. Furthermore, system 1', in addition to having the metadata generating apparatus 40 and the remote metadata processing apparatus 60 may also, optionally, additionally include one or more of any of the other components illustrated in FIG. 7.

The example aspects described here avoid limitations, specifically rooted in computer technology, relating to testing and validation of Advance Driving Assistant Systems (ADAS) and autonomous driving applications. In particular, recording campaigns performed to collect data for ADAS validation may require long distances to be driven in order to collect sufficient data to cover the variety of different driving environments that the ADAS may need to reliably operate under. By virtue of the example aspects described herein, while sensor data (such as image data, Radar data, LIDAR data or the like) for validation of the ADAS under development is recorded during a data recording campaign, metadata is generated for the sensor data and transmitted to a remote metadata processing apparatus. The metadata includes classifications of at least one of: an attribute of a driving environment of the vehicle into a class of a set of predefined classes for the attribute; a driving scenario a driving scenario involving the vehicle which occurred during the acquisition of the sensor data into respective classes of a predefined set of driving scenario classes associated with different driving scenarios. Furthermore, the remote metadata processing apparatus includes an indicator generator module that is arranged to determine whether the received metadata includes at least a predetermined number of classifications in a prescribed class of the set of predefined classes and, based on the determination, generate an indicator for use in the data recording campaign. The metadata received at the remote metadata processing apparatus can be analyzed to determine the type of sensor data that has been recorded. This can improve the efficiency of the data collection process, as the progress of the data recording campaign can be monitored and adjustments (to a planned route for the vehicle, for example) can be made early on in the data-collection process, thus reducing the distance that needs to be driven, and also improving data storage utilization at the vehicle. In addition, the availability of metadata for the collected sensor data reduces the amount of data that needs to be manually labelled by humans and allows efficient selection of a ground-truth data for training the ADAS. Also, by virtue of the foregoing capabilities of the example aspects described herein, which are rooted in computer technology, the example aspects described herein improve computers and computer processing/functionality, and also improve the field(s) of testing and validation of Advance Driving Assistant Systems (ADAS) and autonomous driving applications.

In the foregoing description, example aspects are described with reference to several example implementations. Accordingly, the specification should be regarded as illustrative, rather than restrictive. Similarly, the figures illustrated in the drawings, which highlight the functionality and advantages of the example implementations, are presented for example purposes only. The architecture of the example implementations is sufficiently flexible and configurable, such that it may be utilized (and navigated) in ways other than those shown in the accompanying figures.

Software implementations of the examples presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example implementation. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some implementations may also be implemented by the preparation of application-specific integrated circuits, field-programmable gate arrays, or by interconnecting an appropriate network of conventional component circuits.

Some implementations include a computer program product. The computer program product may be a storage medium or media, instruction store(s), or storage device(s), having instructions stored thereon or therein which can be used to control, or cause, a computer or computer processor to perform any of the procedures of the example implementations described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example implementations described herein. Such software may include without limitation device drivers, operating systems, and user applications. Ultimately, such computer-readable media or storage device(s) further include software for performing example aspects herein, as described above.

Included in the programming and/or software of the system are software modules for implementing the procedures described herein. In some example implementations herein, a module includes software, although in other example implementations herein, a module includes hardware, or a combination of hardware and software.

While various example implementations have been described above, it should be understood that they have been presented by way of example, and not limitation. It will be apparent to persons skilled in the relevant art(s) that various changes in form and detail can be made therein. Thus, the present disclosure should not be limited by any of the above described example implementations, but should be defined only in accordance with the following claims and their equivalents.

Implementations of the metadata processing apparatus described in detail above are summarized in the following numbered clauses:

E1. A metadata processing apparatus for use in a system for assessing progress of a data recording campaign performed to collect sensor data recorded by a sensor data recorder mounted on a vehicle while the vehicle is being driven, the sensor data for use in testing an advanced driving assistance system, ADAS, of the vehicle, wherein the ADAS is arranged to provide driving assistance by processing sensor data being acquired by a sensor module mounted on the vehicle as the vehicle is being driven, the metadata processing apparatus comprising: a data store operable to store metadata received from the metadata generating apparatus, the metadata being based on data acquired by the sensor module and comprising classifications of at least one of: an attribute of a driving environment the vehicle was in during acquisition of the sensor data by the sensor module into respective classes of a predefined set of classes of the attribute; and a driving scenario involving the vehicle which occurred during the acquisition of the sensor data into respective classes of a predefined set of driving scenario classes associated with different driving scenarios, wherein each driving scenario is associated with a respective driving maneuver performed by the vehicle or a driving maneuver performed by a second vehicle with respect to the vehicle; an indicator generator module arranged to determine whether the received metadata comprises at least a predetermined number of classifications in at least one of: a predefined class of the set of predefined classes, in a case where the metadata comprises classifications of the attribute; and a predefined driving scenario class of the set of predefined driving scenario classes associated with different driving scenarios, in a case where the metadata comprises classifications of the driving scenario, wherein the indicator generator module is further arranged to generate, based on the determination, an indicator for use in the data recording campaign.

E2. The metadata processing apparatus according to E1, wherein the sensor data comprises a plurality of sensor data measurements each acquired at a different time instant during the data recording campaign, and the metadata comprises a plurality of metadata data packages, each metadata data package being associated with a respective sensor data measurement of the plurality of sensor data measurements and based on data acquired by the sensor module while the sensor data measurement is being acquired, and each metadata data package comprises at least one of: a respective classification of the attribute of the driving environment the vehicle was in during the acquisition of the sensor data measurement into a respective class of the predefined set of classes of the attribute, in a case where the metadata comprises classifications of the attribute; and a respective classification of the driving scenario involving the vehicle which occurred during the acquisition of the sensor data measurement into respective classes of a predefined set of driving scenario classes associated with different driving scenarios, in a case where the metadata comprises classifications of the driving scenario.

E3. The metadata processing apparatus according to E2, wherein the indicator generator module is arranged to determine whether the stored metadata comprises at least the predetermined number of classifications by determining whether a predetermined number of metadata data packages have respective classifications satisfying a predetermined condition for at least one of: the attribute of the driving environment, in a case where the metadata comprises classifications of the attribute; and the driving scenario, in a case where the metadata comprises classifications of the driving scenario.

E4. The metadata processing apparatus according to E1, wherein in response to determining that the predetermined number metadata data packages have respective classifications satisfying the predetermined condition, the indicator generator module is arranged to generate, as the indicator, a first instruction instructing the sensor data recorder to stop recording sensor data, and the metadata processing apparatus is operable to transmit the first instruction to the vehicle.

E5. The metadata processing apparatus according to any one of E2 to E4, wherein the indicator generator module is arranged to determine whether a metadata data package stored in the data store satisfies a predetermined condition for at least one of: the attribute in a case where the metadata comprises classifications of the attribute; and the driving scenario, in a case where the metadata comprises classifications of the driving scenario, in response to determining that the metadata data package does not satisfy the predetermined condition, generate, as the indicator, a second instruction instructing the sensor data recorder to delete a stored sensor data measurement associated with the metadata data package, and the metadata processing apparatus is arranged to transmit the second instruction to the vehicle.

E6. The metadata processing apparatus according to any one of E1 to E5, wherein the metadata further comprises vehicle status data comprising measurements of one or more of a speed of the vehicle, a yaw rate of the vehicle, a throttle setting of the vehicle and location information of the vehicle made during the acquisition of the sensor data by the sensor module, the metadata processing apparatus further comprises an anomaly detection module arranged to search for an anomaly in the vehicle status data using one or more predefined criteria, and the indicator generator module is further arranged to generate a second indicator for use in the data recording campaign, the second indicator indicating that an anomaly has been detected in the vehicle status data.

E7. The metadata processing apparatus according to any one of E2 to E5, further comprising a dataset selection module, which is arranged to select a subset of sensor data measurements from the plurality of sensor data measurements based on the metadata and a predefined requirement, wherein the predefined requirement specifies at least one of: a required number of sensor data measurements that have corresponding metadata data packages comprising a classification into a predefined class of the attribute, in a case where the metadata comprises classifications of the attribute, and a required number of sensor data measurements that have corresponding metadata data packages comprising a classification into a predefined class of the driving scenario, in a case where the metadata comprises classifications of the driving scenario.

E8. The metadata processing apparatus according to E7, wherein the dataset selection module is arranged to select the subset of sensor data measurements based on the metadata and the predefined requirement by solving, using integer programming, a system of linear equation systems subject to mathematical constraints defined by the predefined requirement, each linear equation of the linear equation system is formed based on classifications included in a respective metadata data package of the plurality of respective metadata data packages, wherein, in a case where the metadata comprises classifications of the attribute, at least one variable of each linear equation corresponds to a predefined class of the attribute, and a coefficient of the at least one variable of each linear equation corresponds to a number of classifications in the predefined class of the attribute indicated by the metadata data package, and wherein, in a case where the metadata comprises classifications of the driving scenario, at least one variable of each linear equation corresponds to a predefined driving scenario class, and a coefficient of the at least one variable of each linear equation corresponds to a number of classifications in the predefined driving scenario class indicated by the metadata data package.

E9. The metadata processing apparatus according to any one of E1 to E8, wherein the attribute of the driving environment of the vehicle comprises at least one of: a type of one or more objects in the driving environment of the vehicle, wherein the data processing apparatus is arranged to process the data acquired by the sensor module to detect one or more objects in the driving environment of the vehicle, and to classify the detected one or more objects according to object type; a number of objects of a predefined one or more types in the driving environment of the vehicle, wherein the data processing apparatus is arranged to process the data acquired by the sensor module to detect one or more objects of the predefined one or more types, and classify the detected one or more objects according to a number of the detected one or more objects; an environment type of the driving environment of the vehicle, wherein the data processing apparatus is arranged to acquire information on the driving environment of the vehicle and classify the driving environment according to environment type; a time-of-day of the driving environment, wherein the data processing apparatus is arranged to acquire a local time of the vehicle and classify the driving environment according to the local time; and a type of weather in the driving environment of the vehicle, wherein the data processing apparatus is arranged to acquire information on a weather condition in the driving environment of the vehicle and use the acquired information on the weather condition to classify the driving environment according to weather type, and wherein the predefined set of driving scenario classes associated with different driving scenarios comprise at least one of: an overtaking class associated with an overtaking maneuver performed by the vehicle; an overtaken class associated with the vehicle being overtaken by a second vehicle; an emergency braking class associated with an emergency braking performed by the vehicle; a cut-in class associated with a second vehicle on the left or right of the vehicle moving into the same lane as the vehicle; a yaw-rate-related maneuver class associated with a yaw rate of the vehicle fulfilling a predefined condition; and a speed-related maneuver class associated with a speed of the vehicle fulfilling a predefined condition.

E10. The metadata processing apparatus according to any one of E1 to E9, wherein the indicator generator module is further arranged to display the indicator on a display.

What is claimed is:

1. A system for assessing progress of a data recording campaign performed to collect sensor data recorded by a sensor data recorder mounted on a vehicle while the vehicle is being driven, the sensor data for use in testing and validating an advanced driving assistance system (ADAS) of the vehicle, wherein the ADAS is arranged to provide driving assistance by processing sensor data being acquired by at least one sensor mounted on the vehicle as the vehicle is being driven, the system comprising:

a metadata generating apparatus; and a remote metadata-processing apparatus including a display, the metadata generating apparatus arranged to generate metadata when mounted on the vehicle and used in the data recording campaign, the metadata generating apparatus comprising:
 a data processing apparatus arranged to process data acquired by the at least one sensor to generate metadata for the sensor data, the at least one sensor including at least one of a camera, a Radar sensor, or a LIDAR sensor that generates the sensor data, and the metadata comprising classifications:
a driving scenario involving the vehicle which occurred during the acquisition of the sensor data into respective classes of a predefined set of driving scenario classes associated with different driving scenarios, wherein each driving scenario is associated with a respective driving maneuver performed by the vehicle or a driving maneuver performed by a second vehicle with respect to the vehicle, and wherein the predefined set of driving scenario classes includes at least one of: an overtaking class associated with an overtaking maneuver performed by the vehicle; an overtaken class associated with the vehicle being overtaken by a second vehicle; an emergency braking class associated with an emergency braking performed by the vehicle; a cut-in class associated with a second vehicle on a left or a right of the vehicle moving into the same lane as the vehicle; a yaw-rate-related maneuver class associated with a yaw rate of the vehicle fulfilling a predefined condition; and a speed-related maneuver class associated with a speed of the vehicle fulfilling a predefined condition; and a communication apparatus arranged to transmit the metadata to the remote metadata processing apparatus; and the remote metadata processing apparatus comprising:
 a data store arranged to store the metadata transmitted by the communication apparatus; and
 at least one processor configured to determine whether the received metadata comprises at least a predetermined number of classifications:
  a predefined driving scenario class of the set of predefined driving scenario classes associated with different driving scenarios, wherein the at least one processor is further configured to generate, based on the determination, an indicator for use in the data recording campaign and to transmit the indicator to the display, the indicator indicating whether enough sensor data has been recorded for the predefined driving scenario class of the set of predefined driving scenario classes, wherein the display is configured to display the indicator to one or more persons overseeing the data recording campaign, and wherein the ADAS is configured to provide at least one of adaptive cruise control, emergency brake assistance, front collision warning, lane departure warning, and lateral control and lane change driving assistance based on the sensor data.

2. The system according to claim 1,
wherein the system further comprises the at least one sensor,
wherein the at least one sensor comprises:
   a first sensor arranged to acquire first sensor data as the vehicle is being driven; and
   a second sensor arranged to acquire second sensor data as the vehicle is being driven, the second sensor being different from the first sensor.

3. The system according to claim 2:
wherein the system further comprises the ADAS,
wherein the ADAS is arranged to provide driving assistance based on the first sensor data, and
wherein the metadata generating apparatus is arranged to generate the metadata by processing the second sensor data.

4. The system according to claim 2, wherein the first sensor and the second sensor each comprise at least one of the camera, the Radar sensor, or the LIDAR sensor.

5. The system according to claim 1,
wherein the system further comprises the at least one sensor,
wherein the at least one sensor comprises:
   a single sensor arranged to acquire the sensor data,
wherein the system further comprises the ADAS, and
wherein the ADAS and the metadata generating apparatus are arranged to process the sensor data acquired by the single sensor.

6. The system according to claim 1,
wherein the sensor data comprises a plurality of sensor data measurements each acquired at a different time instant during the data recording campaign, and
wherein the metadata comprises a plurality of metadata data packages,
wherein the data processing apparatus is arranged to generate each metadata data package for a respective sensor data measurement of the plurality of sensor data measurements and to associate the metadata data package with the respective sensor data measurement,
wherein each metadata data package is generated by processing data acquired by the at least one sensor while the sensor data measurement is being acquired, and
wherein each metadata data package comprises:
   a respective classification of an attribute of the driving environment the vehicle was in during the acquisition of the sensor data measurement into a respective class of the predefined set of classes of the attribute, in a case where the metadata comprises classifications of the attribute; and
   a respective classification of a driving scenario involving the vehicle which occurred during the acquisition of the sensor data measurement into a respective class of the predefined set of driving scenario classes associated with different driving scenarios, in a case where the metadata comprises classifications of the driving scenario.

7. The system according to claim 6, wherein the at least one processor is further configured to determine whether the stored metadata comprises at least the predetermined number of classifications by determining whether a predetermined number of metadata data packages have respective classifications satisfying a predetermined condition for at least one of:
   the attribute of the driving environment, in a case where the metadata comprises classifications of the attribute; and
   the driving scenario, in a case where the metadata comprises classifications of the driving scenario.

8. The system according to claim 7,
wherein in response to determining that the predetermined number metadata data packages have respective classifications satisfying the predetermined condition, the at least one processor is further configured to generate, as the indicator, a first instruction instructing the sensor data recorder to stop recording sensor data,
wherein the remote metadata processing apparatus is arranged to transmit the first instruction to the vehicle.

9. The system according to claim 8,
wherein the system further comprises the sensor data recorder, and
wherein the sensor data recorder is arranged to respond to the first instruction by ceasing to record sensor data.

10. The system according to claim 6,
wherein the system further comprises the sensor data recorder,
wherein the at least one processor is further configured to determine whether a metadata data package stored in the data store satisfies a predetermined condition for at least one of:
   the attribute in a case where the metadata comprises classifications of the attribute; and
   the driving scenario, in a case where the metadata comprises classifications of the driving scenario,
wherein in response to determining that the metadata data package does not satisfy the predetermined condition, the at least one processor is further configured to generate, as the indicator, a second instruction instructing the sensor data recorder to delete a stored sensor data measurement associated with the metadata data package,
wherein the remote metadata processing apparatus is arranged to transmit the second instruction to the vehicle, and
wherein the sensor data recorder is arranged to respond to the second instruction by deleting the stored sensor data measurement associated with the metadata data package.

11. The system according to claim 6, wherein:
the at least one processor is further configured to select a subset of sensor data measurements from the plurality of sensor data measurements based on the metadata and a predefined requirement, wherein the predefined requirement specifies at least one of:
   a required number of sensor data measurements that have corresponding metadata data packages comprising a classification into a predefined class of an attribute, in a case where the metadata comprises classifications of the attribute, and
   a required number of sensor data measurements that have corresponding metadata data packages comprising a classification into a predefined class of the driving scenario, in a case where the metadata comprises classifications of the driving scenario.

12. The system according to claim 11,
wherein the at least one processor is further configured to select the subset of sensor data measurements based on the metadata and the predefined requirement by solving, using integer programming, a system of linear equation systems subject to mathematical constraints defined by the predefined requirement, each linear equation of the linear equation system is formed based on classifications comprised in a respective set of metadata data packages of the plurality of respective metadata data packages,
wherein, in a case where the metadata comprises classifications of the attribute, at least one variable of each linear equation corresponds to a predefined class of the attribute, and a coefficient of the at least one variable of each linear equation corresponds to a number of classifications in the predefined class of the attribute indicated by the set of metadata data packages, and
wherein, in a case where the metadata comprises classifications of the driving scenario, at least one variable of each linear equation corresponds to a predefined driving scenario class, and a coefficient of the at least one variable of each linear equation corresponds to a number of classifications in the predefined driving scenario class indicated by the set of metadata data packages.

13. The system according to claim 1,
wherein the at least one sensor is further arranged to acquire vehicle status data comprising measurements of one or more of:
a speed of the vehicle during the acquisition of the sensor data by the at least one sensor;
a yaw rate of the vehicle during the acquisition of the sensor data by the at least one sensor;
a throttle setting of the vehicle during the acquisition of the sensor data by the at least one sensor; and
location information of the vehicle during the acquisition of the sensor data by the at least one sensor,
wherein the data processing apparatus is arranged to generate the metadata so as to further include the vehicle status data,
wherein the at least one processor is further configured to:
search for an anomaly in the vehicle status data using one or more predefined criteria, and generate a second indicator for use in the data recording campaign, the second indicator indicating that an anomaly has been detected in the vehicle status data.

14. The system according to claim 1, wherein the attribute of the driving environment of the vehicle comprises at least one of:
a type of one or more objects in the driving environment of the vehicle, wherein the data processing apparatus is arranged to process the data acquired by the at least one sensor to detect one or more objects in the driving environment of the vehicle, and to classify the detected one or more objects according to object type;
a number of objects of a predefined one or more types in the driving environment of the vehicle, wherein the data processing apparatus is arranged to process the data acquired by the at least one sensor to detect one or more objects of the predefined one or more types, and classify the detected one or more objects according to a number of the detected one or more objects;
an environment type of the driving environment of the vehicle, wherein the data processing apparatus is arranged to acquire information on the driving environment of the vehicle and classify the driving environment according to environment type;
a time-of-day of the driving environment, wherein the data processing apparatus is arranged to acquire a local time of the vehicle and classify the driving environment according to the local time; or
a type of weather in the driving environment of the vehicle, wherein the data processing apparatus is arranged to acquire information on a weather condition in the driving environment of the vehicle and use the acquired information on the weather condition to classify the driving environment according to weather type.

15. The system according to claim 1, further comprising at least one of:
the at least one sensor;
the sensor data recorder; or
the vehicle.

16. A metadata generating apparatus for use in a system for assessing progress of a data recording campaign performed to collect sensor data recorded by a sensor data recorder mounted on a vehicle while the vehicle is being driven, the sensor data for use in testing an advanced driving assistance system (ADAS) of the vehicle, wherein the ADAS is arranged to provide driving assistance by processing sensor data being acquired by at least one sensor mounted on the vehicle as the vehicle is being driven, the system including a remote metadata processing apparatus, the metadata generating apparatus comprising:
a data processing apparatus arranged to process data acquired by the at least one sensor to generate metadata for the sensor data, the at least one sensor including at least one of a camera, a Radar sensor, or a LIDAR sensor that generates the sensor data, the metadata comprising classifications of at least one of:
a driving scenario involving the vehicle which occurred during the acquisition of the sensor data into respective classes of a predefined set of driving scenario classes associated with different driving scenarios, wherein each driving scenario is associated with a respective driving maneuver performed by the vehicle or a driving maneuver performed by a second vehicle with respect to the vehicle, and wherein the predefined set of driving scenario classes includes at least one of: an overtaking class associated with an overtaking maneuver performed by the vehicle; an overtaken class associated with the vehicle being overtaken by a second vehicle; an emergency braking class associated with an emergency braking performed by the vehicle; a cut-in class associated with a second vehicle on a left or a right of the vehicle moving into the same lane as the vehicle; a yaw-rate-related maneuver class associated with a yaw rate of the vehicle fulfilling a predefined condition; and a speed-related maneuver class associated with a speed of the vehicle fulfilling a predefined condition; and
a communication apparatus operable to:
transmit the metadata to the remote metadata processing apparatus; and
receive from the remote metadata processing apparatus an indicator for use in the data recording campaign, the indicator indicating a determination result of a determination made by the remote metadata processing apparatus of whether the metadata received thereby comprises at least a predetermined number of classifications in:
a predefined driving scenario class of the set of predefined driving scenario classes associated with different driving scenarios, wherein the metadata generating apparatus is arranged to generate metadata when mounted on the vehicle and used in the data recording campaign, wherein the indicator indicates whether enough sensor data has been recorded for the predefined driving scenario class of the set of predefined driving scenario classes, wherein the vehicle includes a display configured to display the indicator to a drive of the vehicle overseeing the data recording campaign, and wherein the ADAS is configured to provide at least one of adaptive cruise control, emergency brake assistance, front collision warning, lane departure warning, and lateral control and lane change driving assistance based on the sensor data.

17. The system according to claim 16, further comprising at least one of:
the remote metadata processing apparatus;
the at least one sensor;
the sensor data recorder; or
the vehicle.

18. A metadata processing apparatus for use in a system for assessing progress of a data recording campaign performed to collect sensor data recorded by a sensor data recorder mounted on a vehicle while the vehicle is being driven, the sensor data for use in testing an advanced driving assistance system (ADAS), of the vehicle, wherein the ADAS is arranged to provide driving assistance by processing sensor data being acquired by at least one sensor mounted on the vehicle as the vehicle is being driven, the metadata processing apparatus comprising:

a data store operable to store metadata received from the metadata generating apparatus, the metadata being based on data acquired by the at least one sensor, the at least one sensor including at least one of a camera, a Radar sensor, or a LIDAR sensor that generates the sensor data, and the metadata comprising classifications of:

a driving scenario involving the vehicle which occurred during the acquisition of the sensor data into respective classes of a predefined set of driving scenario classes associated with different driving scenarios, wherein each driving scenario is associated with a respective driving maneuver performed by the vehicle or a driving maneuver performed by a second vehicle with respect to the vehicle, and wherein the predefined set of driving scenario classes includes at least one of: an overtaking class associated with an overtaking maneuver performed by the vehicle; an overtaken class associated with the vehicle being overtaken by a second vehicle; an emergency braking class associated with an emergency braking performed by the vehicle; a cut-in class associated with a second vehicle on a left or a right of the vehicle moving into the same lane as the vehicle; a yaw-rate-related maneuver class associated with a yaw rate of the vehicle fulfilling a predefined condition; and a speed-related maneuver class associated with a speed of the vehicle fulfilling a predefined condition;

at least one processor configured to determine whether the received metadata comprises at least a predetermined number of classifications in:

a predefined driving scenario class of the set of predefined driving scenario classes associated with different driving scenarios, wherein the at least one processor is further configured to generate, based on the determination, an indicator for use in the data recording campaign and to transmit the indicator to a display, the indicator indicating whether enough sensor data has been recorded for the predefined driving scenario class of the set of predefined driving scenario classes, wherein the display is configured to display the indicator to one or more persons overseeing the data recording campaign, and wherein the ADAS is configured to provide at least one of adaptive cruise control emergency brake assistance, front collision warning, lane departure warning, and lateral control and lane change driving assistance based on the sensor data.

19. The system according to claim 18, further comprising at least one of:
the at least one sensor;
the sensor data recorder; or
the vehicle.

* * * * *

UNITED STATES PATENT AND TRADEMARK OFFICE
CERTIFICATE OF CORRECTION

PATENT NO. : 12,246,723 B2  
APPLICATION NO. : 17/647336  
DATED : March 11, 2025  
INVENTOR(S) : Marcin Szelest et al.

Page 1 of 1

It is certified that error appears in the above-identified patent and that said Letters Patent is hereby corrected as shown below:

In the Claims

Column 30, Line 29: In Claim 1, delete "classifications:" and insert --classifications--

Column 30, Line 57: In Claim 1, delete "classifications:" and insert --classifications--

Column 36, Line 34: In Claim 18, after "control", insert --,--

Signed and Sealed this  
Twenty-ninth Day of April, 2025

Coke Morgan Stewart  
*Acting Director of the United States Patent and Trademark Office*